United States Patent
Sharp et al.

(10) Patent No.: US 7,189,040 B2
(45) Date of Patent: Mar. 13, 2007

(54) COMPOSITE IMPACT ASSEMBLY

(75) Inventors: Jeffery J Sharp, Cochrane (CA); Russell L Schlender, Calgary (CA); Daniel G Strasser, Calgary (CA)

(73) Assignee: Dynetek Industries Ltd., Calgary (CA)

( * ) Notice: Subject to any disclaimer, the term of this patent is extended or adjusted under 35 U.S.C. 154(b) by 132 days.

(21) Appl. No.: 10/906,067

(22) Filed: Feb. 1, 2005

(65) Prior Publication Data
US 2005/0169724 A1    Aug. 4, 2005

Related U.S. Application Data

(60) Provisional application No. 60/541,037, filed on Feb. 3, 2004.

(51) Int. Cl.
*B60P 7/12* (2006.01)
(52) U.S. Cl. ........................................ 410/42
(58) Field of Classification Search ................. 410/42; 296/187.01, 187.03, 191, 182.1, 3; 211/13.1; 224/403
See application file for complete search history.

(56) References Cited

U.S. PATENT DOCUMENTS

| | | |
|---|---|---|
| 4,136,226 A | 1/1979 | Gilman |
| 4,226,337 A | 10/1980 | Abbott |
| 4,343,846 A | 8/1982 | Kohn |
| 4,423,802 A | 1/1984 | Botzem et al. |
| 4,428,993 A | 1/1984 | Kohn et al. |
| 4,461,666 A | 7/1984 | Kohn |
| 4,665,678 A | 5/1987 | Müller et al. |
| 4,671,550 A | 6/1987 | Molnar |
| 5,128,196 A * | 7/1992 | Luetkens, Jr. et al. ...... 428/213 |
| 5,139,845 A | 8/1992 | Beckerman et al. |
| 5,180,190 A | 1/1993 | Kersey et al. |
| 5,197,256 A | 3/1993 | Martin |
| 5,254,798 A | 10/1993 | Zoback |
| 5,690,378 A | 11/1997 | Romesburg |
| 5,798,160 A | 8/1998 | Kohn |
| 5,799,685 A | 9/1998 | Tezuka et al. |

(Continued)

OTHER PUBLICATIONS

Composite Bumper Panel—www.baltek.com/case_histories/industrial/mayslanding/myslndg.html.

(Continued)

*Primary Examiner*—H Gutman
(74) *Attorney, Agent, or Firm*—Sean W. Goodwin; Linda M. Thompson

(57) ABSTRACT

A bumper having an outer compressible layer, such as foam, positioned to absorb an impact and an inner layer of fiberglass laminated end-grain balsa for transferring residual load. The layers are wrapped in a fiberglass skin or urethane coating. The bumper is particularly useful when integrated into a frame used to mount fuel cylinders onto a vehicle roof. The bumper is attached to the frame using struts or balsa pillars and mounting plates so that loading resulting from an impact is transferred from the bumper and into the frame for preventing damage to the fuel cylinders. The mounting system can be configured to mount cylinders longitudinally in the direction of travel of the vehicle or transverse to the direction of travel. A bumper is attached at the front of the frame and a second bumper may be positioned at the back of the frame depending upon the configuration of the mounting.

26 Claims, 26 Drawing Sheets
(4 of 26 Drawing Sheet(s) Filed in Color)

U.S. PATENT DOCUMENTS

| | | |
|---|---|---|
| 6,040,080 A | 3/2000 | Minami et al. |
| 6,062,632 A | 5/2000 | Brachos et al. |
| 6,117,519 A | 9/2000 | Burns |
| 6,257,360 B1 | 7/2001 | Wozniak et al. |
| 6,318,775 B1 | 11/2001 | Heatherington et al. |
| 6,371,541 B1 | 4/2002 | Pedersen |
| 6,595,575 B2 * | 7/2003 | Morris .................. 296/136.02 |

OTHER PUBLICATIONS

Composite Basics—www.mdacomposites.org/psgbridge_CB_print_materials.html.

* cited by examiner

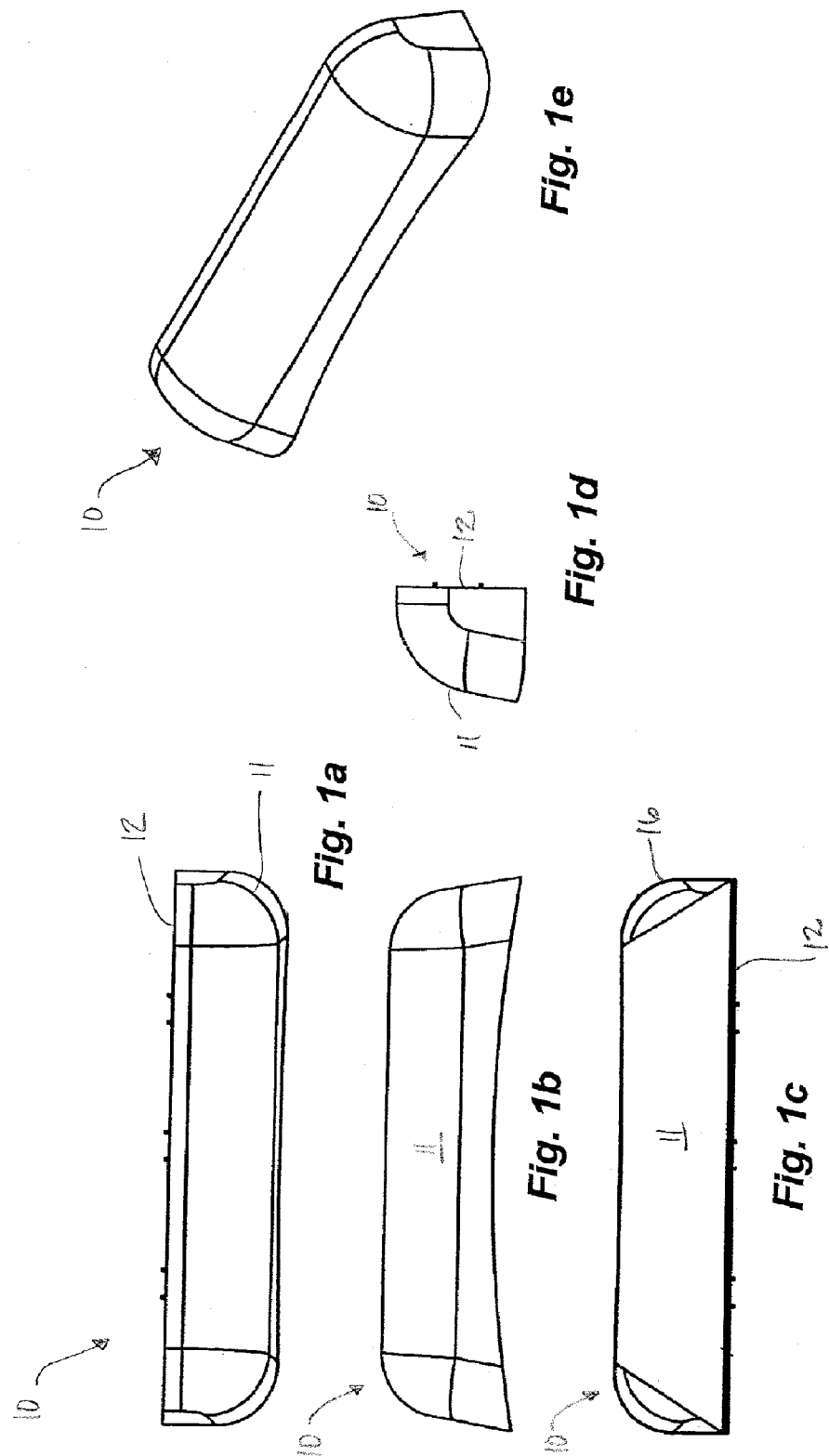

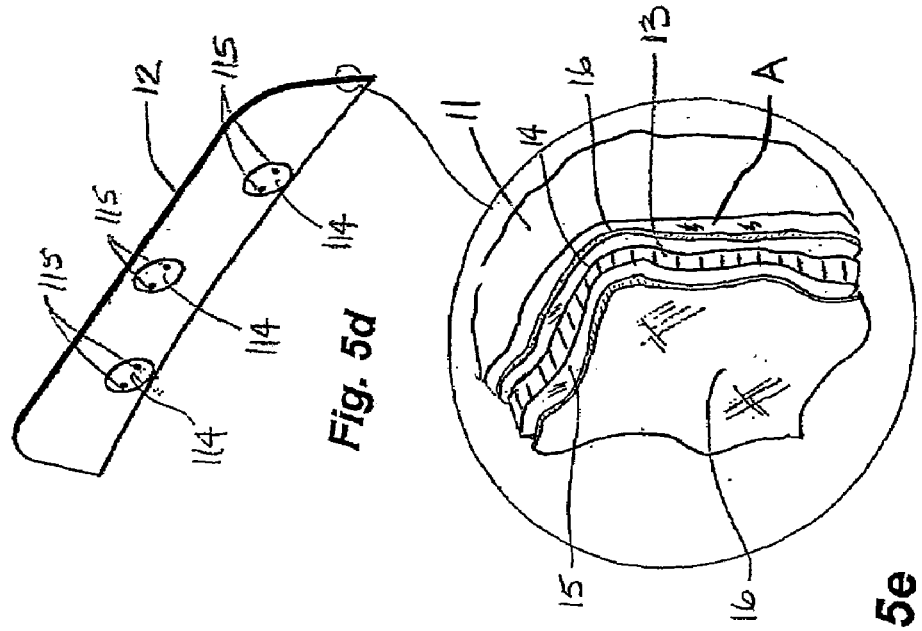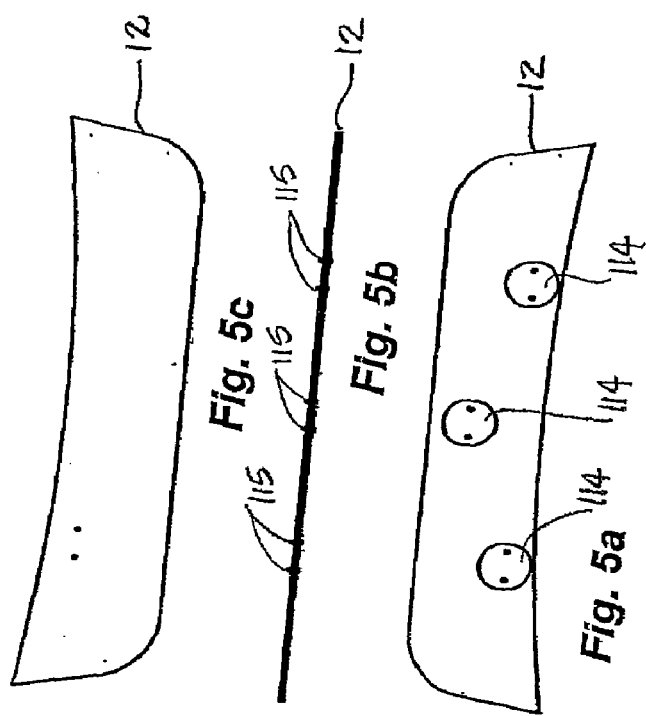

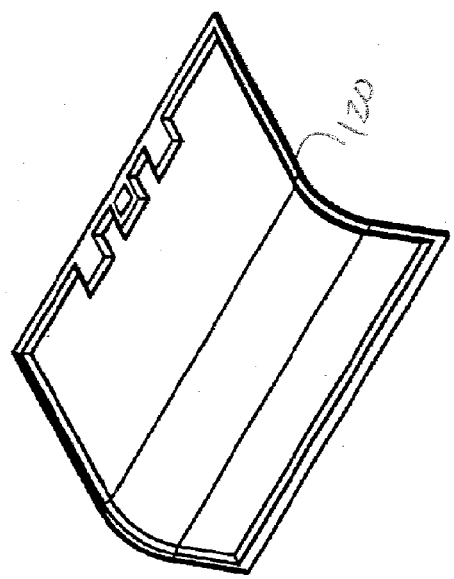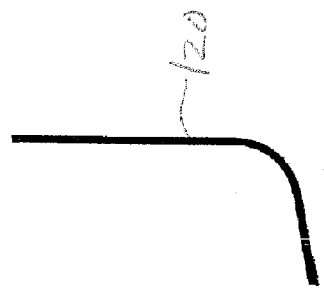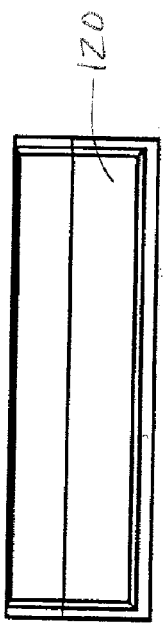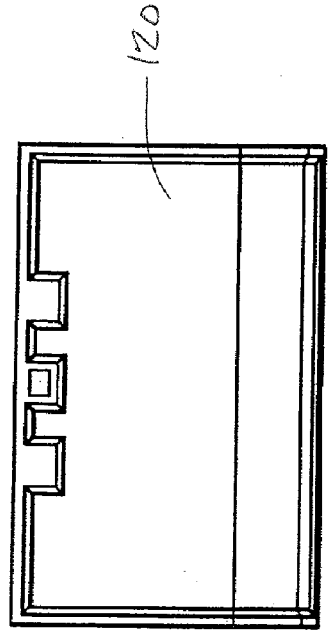
Fig. 6a
Fig. 6d
Fig. 6b
Fig. 6c

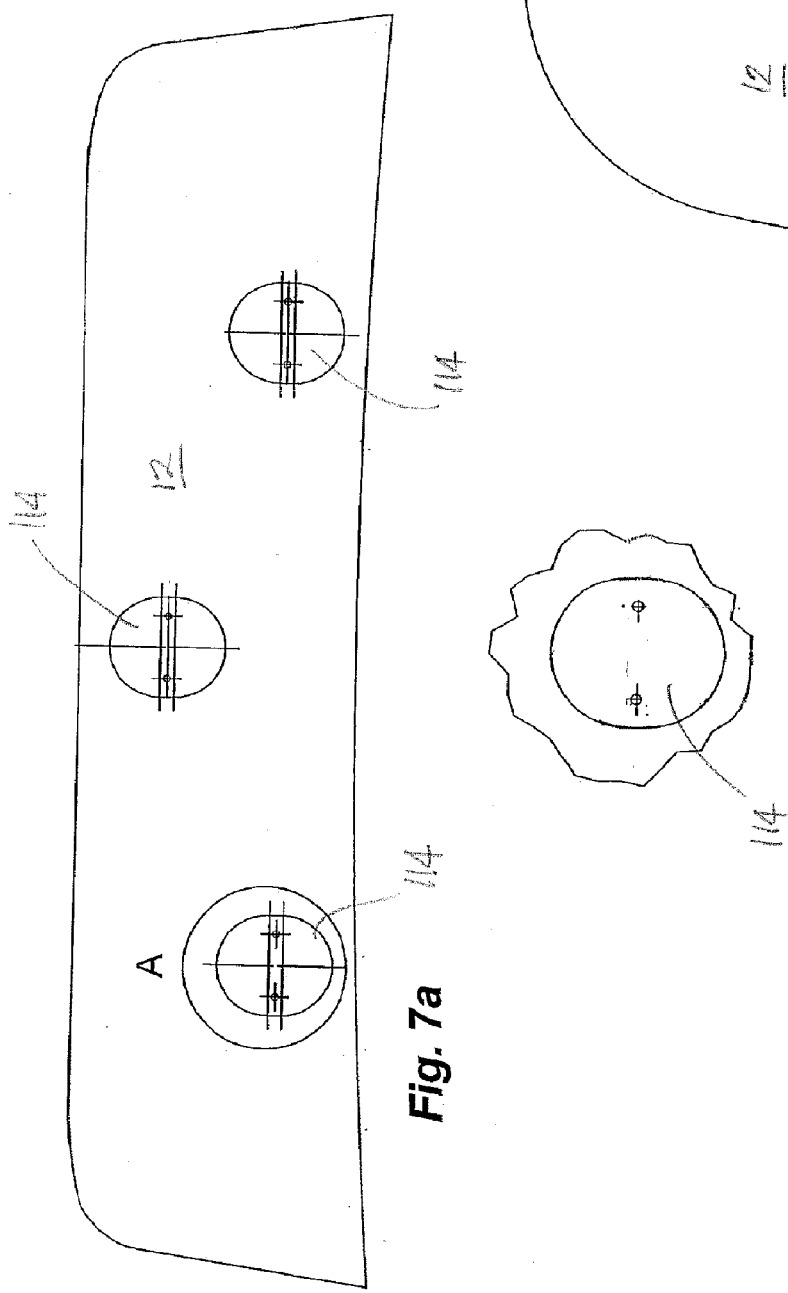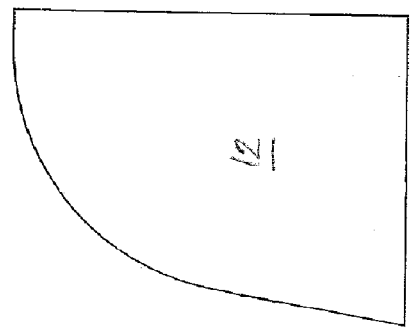
Fig. 7a  Fig. 7b  Fig. 7c

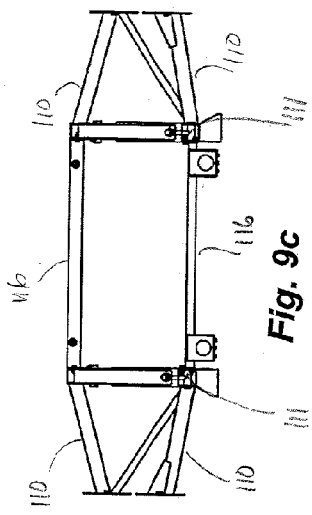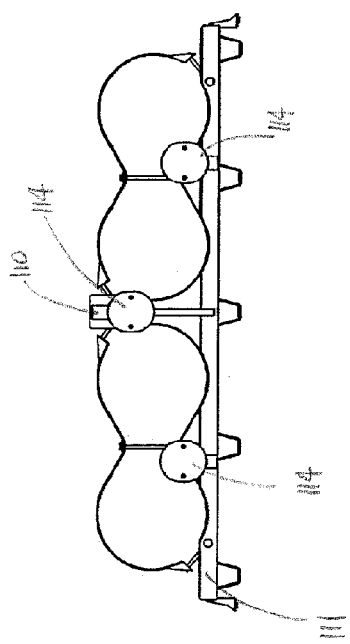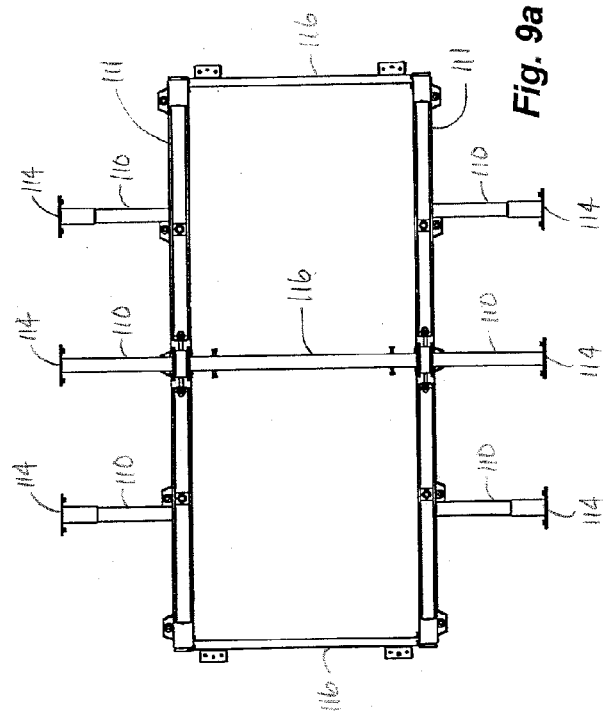

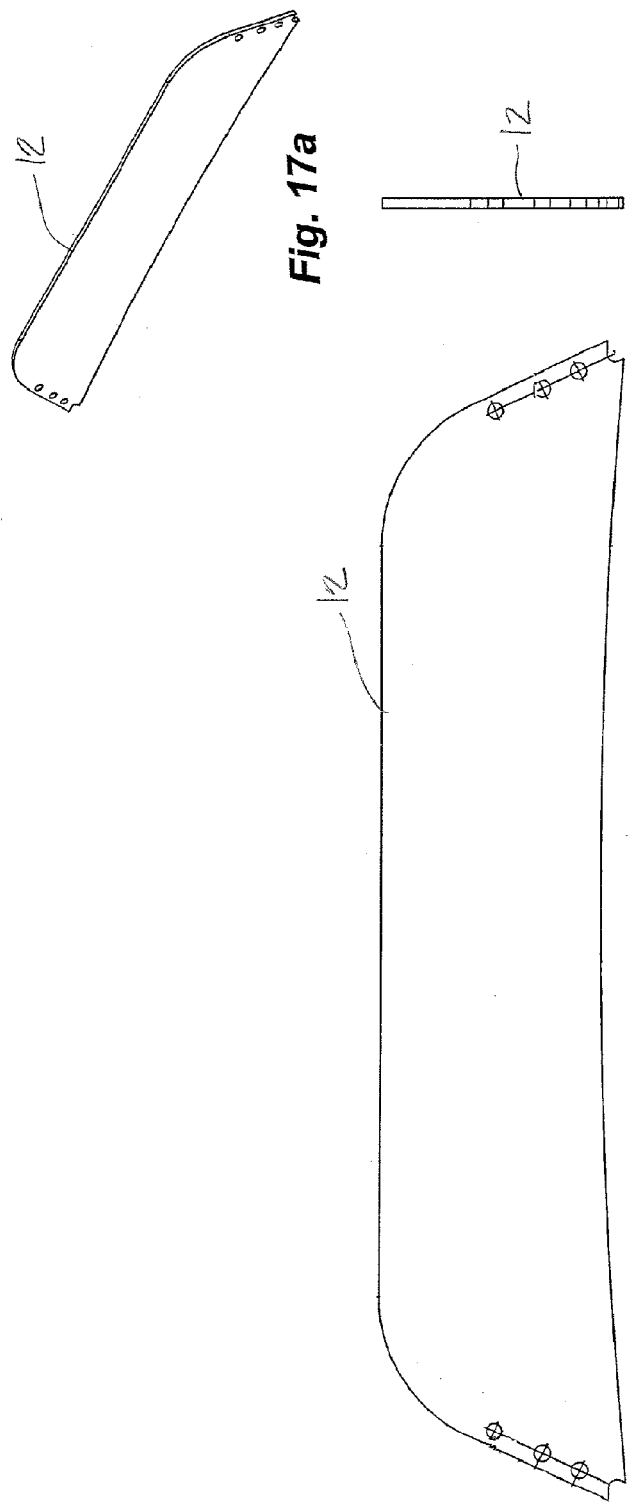

Von Mises Stress Plot (MPa)

Von Mises Stress Plot (MPa)

Von Mises Stress Plot (MPa)
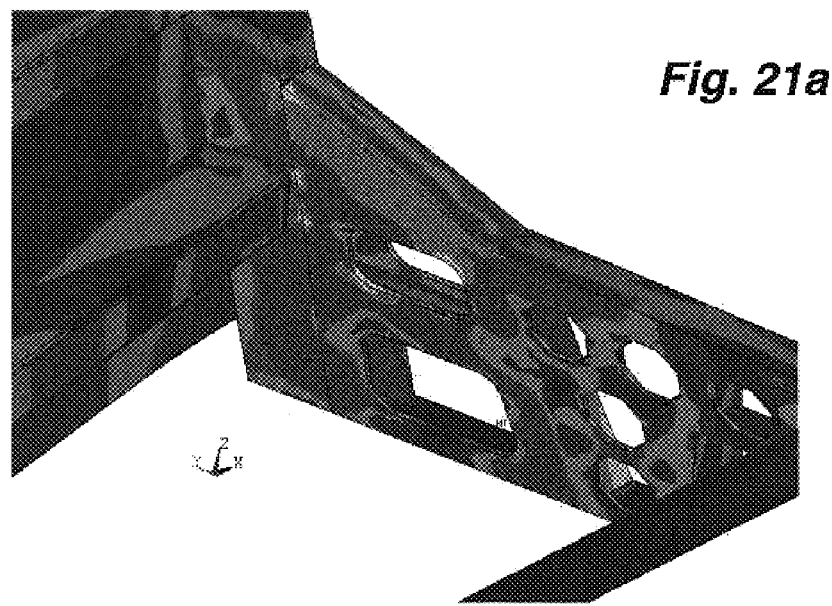
Fig. 21a
Fig. 21b
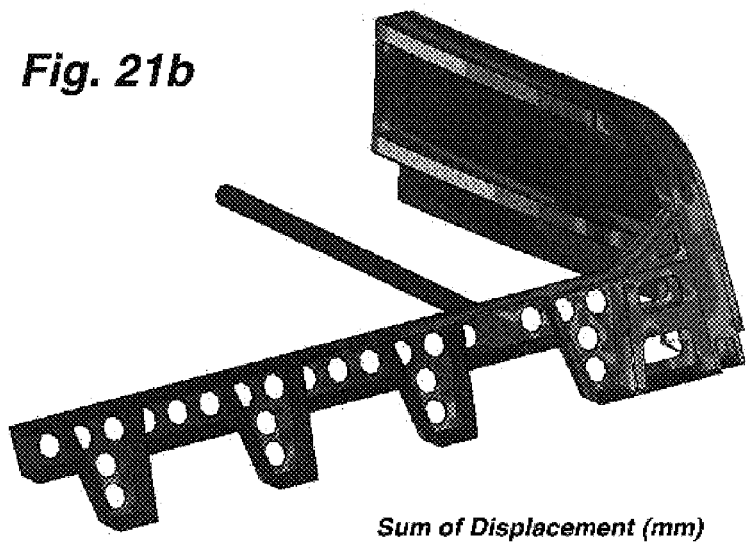
Sum of Displacement (mm)

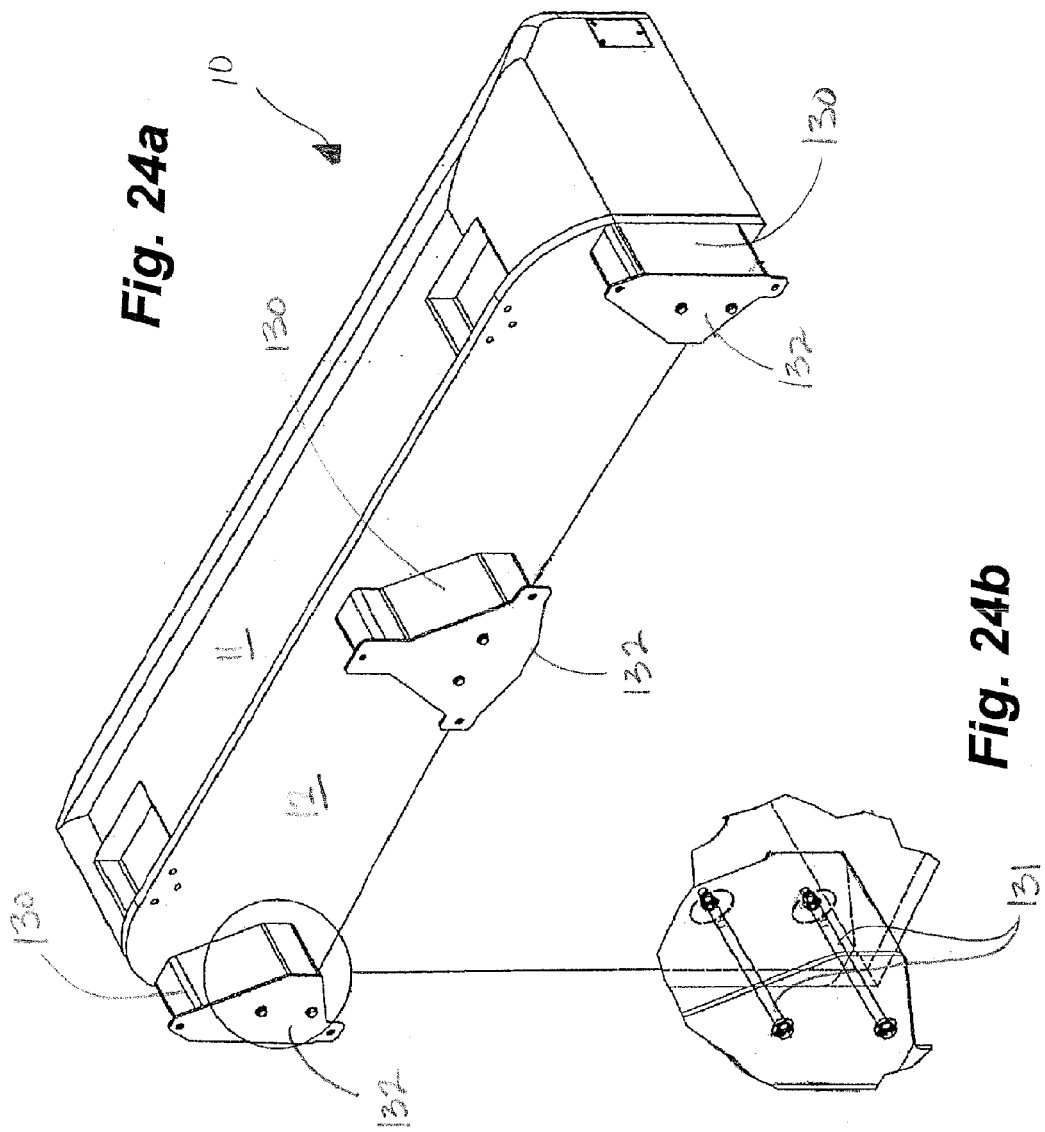

COMPOSITE IMPACT ASSEMBLY

CROSS REFERENCE TO RELATED APPLICATION

This application is a regular application claiming priority of U.S. Provisional Patent application Ser. No. 60/541,037 filed on Feb. 3, 2004, the entirety of which is incorporated herein by reference.

FIELD OF THE INVENTION

The invention relates to assemblies used to absorb impact and more particularly to bumpers used to absorb impact to roof mounting systems for fuel cylinders.

BACKGROUND OF THE INVENTION

It is known, particularly for vehicles using alternative fuels such as CNG, LNG and hydrogen, to mount a plurality of fuel cylinders to the roof of a vehicle. Typically, metal frames are used to secure the cylinders to the vehicle's roof, using metal structural members to absorb and transfer any impact away from the cylinders and the associated valving. Unfortunately, the addition of such apparatus adds considerably to the overall weight of the roof mounting system making these systems less than desirable. Further, damage to the structural members used to absorb and transfer the impact may ultimately result in loss of integrity of the cylinders should the members be sheared from the overall mounting system or be deflected significantly towards the cylinders in crash or high-impact situations.

In order to meet NFPA 52 2002 and CSA B109-01 certification in both the US and Canada, respectively, the mounting systems must be designed to withstand dynamic loading as a result of normal operation and in the event of a crash. Pressure vessels or cylinders must be restrained due to inertial loading as well as be protected from direct impact. The dynamic loads which must be safely restrained in the event of a crash are specified in terms of multiples of gravity. Frames are provided to absorb and meet requirements of the vehicle and further to surround the cylinders. Impact may also be directed to the roof mounting itself. The loading designs must accommodate both longitudinal and transverse orientation of the vessels and is dependant upon the standards to be met. In Canada, cylinders are typically oriented in the same direction as travel of the vehicle. Dynamic loading must be at least 20 g in the longitudinal direction of the vehicle and 8 g in any other direction. Impact standards require protection of the fuel cylinders under specified mass and momentum conditions. These loads supersede those required for normal operation and are generally more stringent than those imposed in the US and in other pats of the world.

Frames are known which are resistant to inertial loading as a result of vehicle impact. In 1998, Lincoln Composites (Lincoln, Nebr., USA), a division of Advanced Technical Products, Inc., disclosed a modular concept for roof mounting utilizing a lightweight truss frame, expandable to accommodate various lengths of cylinders. Integration of the modules to the bus roof is accomplished by utilizing mounting brackets that can be relocated along the length of the modules to correspond with the roof "hard points". The modular frame comprises end frames spacing two rails and a plurality of truss-like central frame members running lengthwise in the same direction as the cylinders and separating the cylinders, thus adding structural rigidity to the frame.

Other frames have been designed to meet safety requirements and weight restrictions. One such known design is that used typically for roof-mounting in low floor buses comprising a frame structure of end members and cross members. The frame has steel straps at two places along each pressure vessel, clamping each into the frame.

In the Lincoln Composites system described above, cylinders are positioned with their longitudinal axis oriented in the same direction as the longitudinal axis of the vehicle. In other known frames, cylinders are oriented with their longitudinal axis at 90 degrees to the frame rails and to the longitudinal axis of the vehicle. The differences in orientation of the cylinders are representative of differences in mounting conventions between North America and those in Japan and Europe.

U.S. Pat. No. 6,257,360 to Wozniak et al. teaches a plurality of compressed gas cylinders nested within shock-absorbing foam positioned within a container or outer shell which is strapped to the chassis of a vehicle. The outer shell of fiberglass and impact-absorbing foam contained therein serves to protect the cylinders from impact loads.

The known mounting systems typically utilize multiple-component, complete and heavy frames into which cylinders are mounted or rely on foam alone to absorb impact and protect the integrity of the vessels.

What is desired is a lightweight impact-absorption system, which alone or in combination with a mounting system, protects a structure and particularly roof-mounted cylinders both from inertial loading and from direct impact to the cylinders as a result of the impact by absorbing the impact and transferring any residual load away from the cylinders so as to diminish any adverse effects thereon.

SUMMARY OF THE INVENTION

An embodiment of a lightweight impact absorbing impact assembly comprises a unitary impact-absorbing assembly or bumper having a lightweight compressible foam outer layer and a lightweight highly cellular load-transferring inner layer, preferably an end-grain balsa core laminated with a fiber-reinforced plastic, such as epoxy fiberglass, the outer layer and inner layer wrapped together in a polymer skin, such as a urethane, a polyurethane resin or an epoxy fiberglass layer or coating. The outer foam layer is adhesively bonded to the inner load-transferring layer using a compatible adhesive, such as an epoxy or urethane adhesive, prior to wrapping or coating.

In use, to protect one or more fuel cylinders mounted on vehicles from impact loading, embodiments of the impact assembly of the present invention are integrated into mounting systems such that reduced and residual load following impact compression of the foam layer and absorption into the rear balsa layer is transferred to the mounting system, thus avoiding contact with and minimizing transference of energy to the cylinders, preventing shearing of the cylinders from the mounting system and preventing loss of integrity of the one or more cylinders.

Regardless the orientation of the fuel cylinders relative to the direction of travel of the vehicle, lightweight mounting frames are provided to mount the fuel cylinders to the vehicle, such as to the roof of a bus, so as to cause any residual load resulting from the impact, following the action of the impact assembly, to be transferred to the mounting frame.

Typically, in the case where the fuel cylinders are mounted longitudinally on the vehicle, aligned with the direction of travel, an embodiment of a mounting system comprises longitudinal frame members interconnected to transverse mounting members and to at least a front impact assembly, having a compressible foam outer layer and an inner load-transferring epoxy fiberglass-laminated balsa layer. The frame members are fastened to the impact assembly's inner layer for transferring residual load through the frame, preferably by an intermediate member or strut fastened to the impact assembly at a mounting plate. The frame members may be adhesively fastened to the inner layer or alternatively, may be mechanically fastened to the inner layer.

Typically, in the case of fuel cylinders that are mounted transverse to the direction of travel, a pair of spaced, parallel longitudinal frame members are provided to which opposing ends of the fuel cylinders are mounted, the cylinders further acting as structural members. Additional transverse support members for spacing and supporting the longitudinal members may be provided at intervals along the length of the longitudinal members. At least a front impact assembly spans across and is connected to a first end of each of the longitudinal members, residual load being transferred from the inner layer of the impact assembly to the longitudinal members. Preferably, the impact assembly is mechanically fastened to the longitudinal support members.

Typically, there are no intermediate frame members between the two longitudinal support members adjacent the impact assembly. For greater support across a front impact assembly, however, a reinforcing beam assembly may be positioned transversely between the longitudinal support members adjacent the inner layer and extending substantially along a transverse width of the impact assembly.

Preferably, the reinforcing beam assembly further comprises a lightweight hollow aluminum support beam having a carbon fiber/epoxy strip bonded to a rearward/inward edge of the beam. The carbon fiber/epoxy strip is bonded to the side which would enter tension in an impact for increasing the stiffness of the beam.

BRIEF DESCRIPTION OF THE DRAWINGS

The patent or application file contains at least one drawing executed in color. Copies of this patent or patent application with color drawing(s) will be provided by the Office upon request and payment of the necessary fee.

FIGS. 1a–1e illustrate an embodiment of an impact assembly comprising an outer compression layer and an inner laminated balsa layer wrapped in a fiberglass skin, more particularly, FIG. 1a is a top view of an embodiment of an impact assembly comprising the inner laminated balsa layer having fasteners protruding therefrom for attachment to a structure, FIG. 1b is a front end view according to FIG. 1a, FIG. 1c is a bottom view according to FIG. 1a, FIG. 1d is an end view according to FIG. 1a, and FIG. 1e is a front perspective view according to FIG. 1a;

FIG. 2a is an external top view of an embodiment of an impact assembly according to FIGS. 1a–1e, FIG. 2b is an external front end view according to FIG. 1a, FIG. 2c is an external bottom view according to FIG. 1a, FIG. 2d is an external end view according to FIG. 1a, and FIG. 2e is an external front perspective view according to FIG. 1a;

FIG. 3a is a top view of the outer compression layer, FIG. 3b is a front end view according to FIG. 3a, FIG. 3c is a bottom view according to FIG. 3a, FIG. 3d is a side view according to FIG. 3a, and FIG. 3e is a front end perspective view according to FIG. 3a;

FIGS. 5a–5e illustrate an embodiment of the inner laminated balsa layer according to FIGS. 4a and 4b, more particularly, FIG. 5a is a rear end view of the inner layer illustrating a plurality of load absorbing attachment plates fastened thereto, FIG. 5b is a top view according to FIG. 5a, FIG. 5c is a front end view according to FIG. 5a, rotated about FIG. 5b, FIG. 5d is a perspective view according to FIG. 5a, and FIG. 5e is a partial cutaway view of a portion of the inner laminated balsa layer illustrating a balsa core and fiberglass lamination layers;

FIGS. 6a–6d illustrate an embodiment of a gull wing door for the mounting system according to FIGS. 1a–2e, the impact assembly according to FIGS. 3a–3e and the inner laminated balsa layer according to FIGS. 5a–5d, more particularly, FIG. 6a is an internal perspective view of the gull wing door, FIG. 6b is an external end view according to FIG. 6a, FIG. 6c is an internal view according to FIG. 6a, and FIG. 6d is a side view according to a mirror image of FIG. 6a;

FIG. 7a is a back view of the impact assembly and particularly the inner laminated balsa layer illustrating the points at which the struts and flanges of the frame are fastened;

FIG. 7b is a detailed view of A according to FIG. 7a illustrating the flange attachment; and FIG. 7c is a side view of the bumper according to FIG. 7a;

FIG. 9a is a bottom view according to FIG. 8;

FIG. 9b is a front end view according to FIG. 8; and

FIG. 9c is a side view according to FIG. 8;

FIG. 10b is a perspective view according to FIG. 10a.

FIG. 11a is a front end view according to FIG. 10a;

FIG. 11b is a side view according to FIG. 10a; and

FIG. 11c is a perspective view according to FIG. 11a illustrating the mounting system of FIGS. 10a and 10b, with the doors closed;

FIG. 16a is an isometric view of the beam assembly, FIG. 16b is a top view according to FIG. 16a illustrating a plurality of attachments adapted for mounting a roof thereto, FIG. 16c is a rear view of the beam assembly illustrating a linear support beam having a carbon-fiber strip adhesively bonded to a rearward/inward side for increasing the stiffening of the support beam, FIG. 16d is a bottom view of the beam assembly, and FIG. 16e is a detailed view of the mounting attachments for fastening the mounting system to the vehicle;

FIG. 17a is an isometric view of an inner laminated balsa layer according to FIG. 12, FIG. 17b is a rear view of the inner laminated balsa layer according to FIG. 17a, FIG. 17c is a side view of the inner laminated balsa layer according to FIG. 17a;

FIG. 18b is a top view according to FIG. 18a,

FIG. 18c is a rear view according to FIG. 18a,

FIG. 18d is a front end view according to FIG. 18a;

FIG. 21a is a Von Mises Stress plot illustrating a frame according to an embodiment of the invention as shown in FIG. 12, the cylinders being oriented transversely to the direction of travel of the vehicle and having undergone an impact;

FIG. 21b is a sum displacement plot illustrating the displacement resulting from the impact according to FIG. 20a;

FIG. 22b is a deflection plot illustrating deflection of an aluminum beam having an epoxy/carbon fiber reinforcement strip adhesively bonded thereto and tested under impact conditions according to FIG. 22a;

FIG. 24a is a rear perspective view according to FIG. 23 and illustrating the balsa pillars and mounting plates adhesively attached thereto for mounting to a frame;

FIG. 24b is a detailed view according to FIG. 24b showing optional mechanical fastening of the mounting plates and pillars to the inner layer;

FIG. 25b is a front view according to FIG. 25a;

DETAILED DESCRIPTION OF THE PREFERRED EMBODIMENT

Figure 2E:
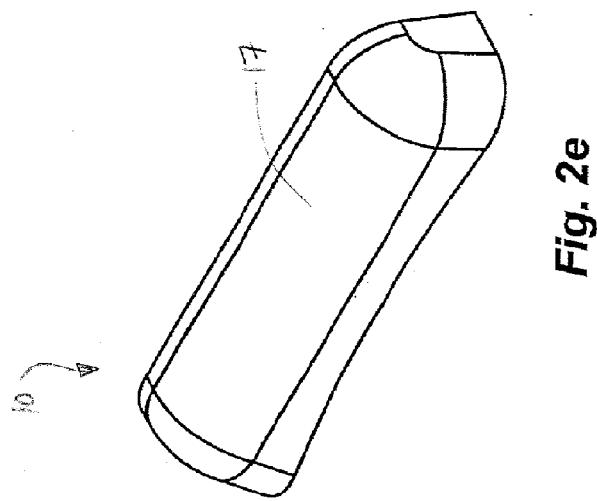
FIGS. 2a–2e are external views according to FIGS. 1a–1e, more particularly.
Figure 2D:
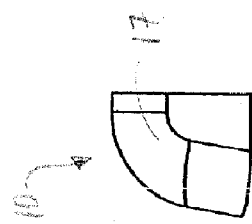
Figure 2A:
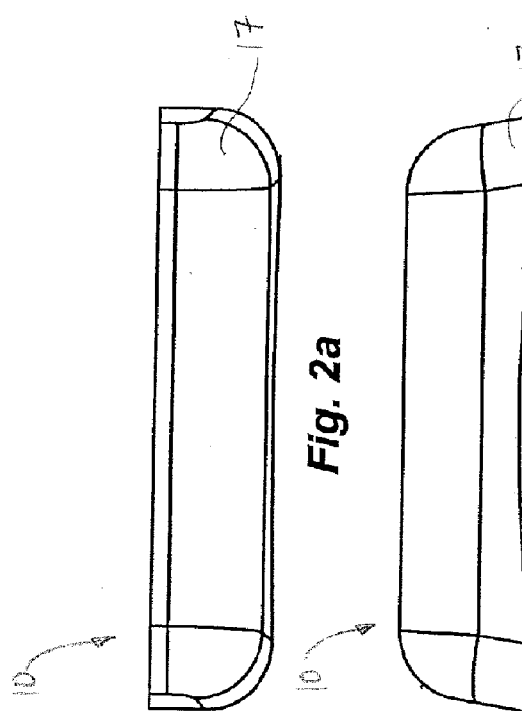
Figure 2B:
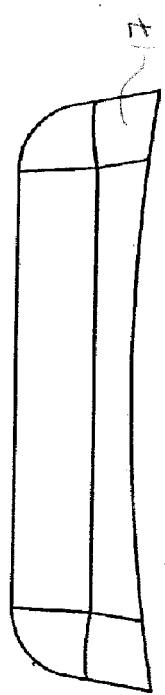
Figure 2C:
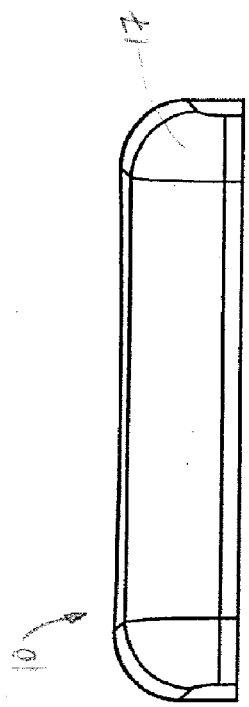
Figure 3E:
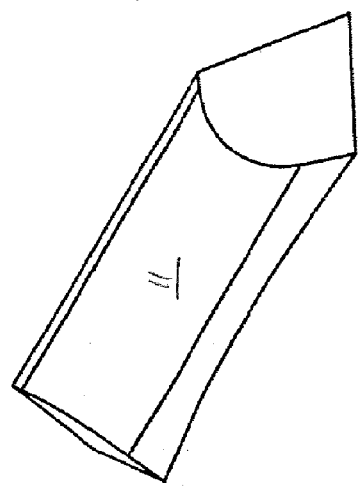
FIGS. 3a–e illustrate an embodiment of an outer compression layer or bumper for use in the impact assembly of FIGS. 1a–2e, more particularly.
Figure 3D:
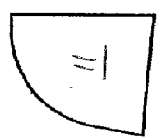
Figure 3A:
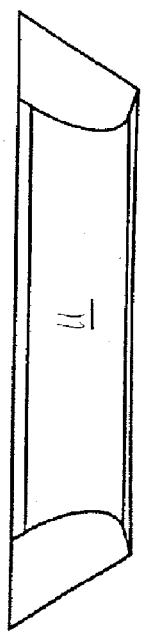
Figure 3B:
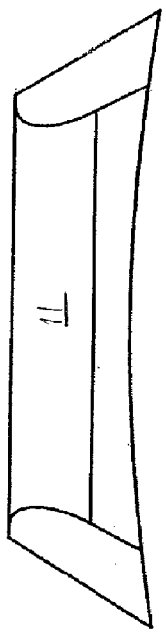
Figure 3C:

As shown in FIGS. 1a–3e, 5a–5e, and 17a–18d, embodiments of a composite impact-absorbing assembly 10 comprise a lightweight, easily compressible outer layer 11 and a highly cellular, lightweight load-transferring inner layer 12. Preferably, the outer layer 11 is foam and the inner layer 12 is an end-grain balsa core 13 laminated on first and second surfaces 14,15 with a fiber-reinforced plastic such as epoxy fiberglass 16 (FIG. 5e). The outer layer and inner layers 11, 12 are wrapped together or coated in a polymer skin 17, such as urethane, polyurethane resin or an epoxy fiberglass, forming a unitary impact assembly 10. The outer foam layer 11 is bonded using an adhesive A to the inner load-transferring laminated balsa layer 12, prior to enclosing with the skin 17.

In use, the composite impact assembly 10 may be used in a variety of applications to reduce the damage caused by impact and particularly to protect structures to which the impact assembly 10 may be fastened. The compression requirements and load absorption and dispersion requirements are determined relative to the use to which the impact assembly 10 may be put and may further determine the selection of materials used for the inner and outer layers 11,12.

Herein the term "front" indicates the position of an impact assembly 10 which is located to intercept the most likely source of an impact.

As shown in FIGS. 4a–18d, embodiments of at least a first or front impact assembly 10 may be used to protect vehicle-mounted fuel cylinders 100 from impact loading as a result of crash conditions. Such impact assemblies 10 utilize a compressible foam, such as a polystyrene foam insulation, as the outer compressible foam layer 11 and a laminated end grain balsa core panel 12. The impact assembly 10 and the cylinders 100 are integrated into frames 101 for forming mounting systems 102. The impact assembly 10 is connected to the frame 101 such that reduced and residual load, following impact compression of the foam layer 11 and absorption into the inner laminated balsa layer 12, is transferred to the frame 101. Through energy absorption and direction, one minimizes transference of energy to the cylinders 100, so as to prevent shearing of the cylinders 100 from the frame 101 and prevent loss of integrity of one or more of the cylinders 100.

Depending upon the orientation of the fuel cylinders 100 relative to a direction of travel of a supporting vehicle various different mounting systems 102 may be provided, such as to mount the cylinders 100 to the roof of a bus, so as to cause any residual load resulting from an impact, to be transferred to the frame 101 and not to the cylinders 100.

EXAMPLE A

Material Selection

In one example, lightweight materials were selected for the inner and outer layers 11,12 to provide impact protection for fuel cylinders 100 mounted to the roof of a vehicle and therefore in danger of impact loading as a result of crash conditions.

The theoretical performance of foam was tested for deflection using the application of incremental loading. A hydraulic ram having an area of 2.24 in$^2$ was used to apply pressure to a sample of polystyrene insulation, from having a width of 95.9 mm and height of 70.1 mm, a length of 49.5 mm and a total area of 6722.6 mm$^2$. The results are shown in Table A.

TABLE A

| Ram Pressure (psi) | Ram Force (N) | Pressure on Sample (Pa) | Deformed Length (mm) | Strain |
|---|---|---|---|---|
| 125 | 1245.5 | 185271.2 | 49.0 | 0.01 |
| 250 | 2491.0 | 370542.4 | 43.0 | 0.13 |
| 375 | 3736.5 | 5558113.5 | 19.0 | 0.62 |
| 500 | 4982.0 | 741084.7 | 15.0 | 0.70 |
| 625 | 6227.5 | 926355.9 | 9.0 | 0.82 |
| 750 | 7473.0 | 1111627.1 | 8.0 | 0.84 |
| 1000 | 9964.0 | 1482169.4 | 6.0 | 0.88 |

Type 3 PLASTISPAN™ polystyrene insulation, available from Plasti-Fab Ltd., Calgary, Alberta, Canada, was selected for use as the foam for the compression layer 11 based on theoretical calculation of the defection of the foam under load conditions using a bus gross vehicle weight of 30.2e$^3$ Kg and initial velocity of 2.22 m/s, a final velocity of 0 m/s and a volume of foam of 0.3 m$^3$. It was calculated that the foam would deform 59% in the longitudinal direction under the stated load conditions.

The inner load-transferring layer 12 of lightweight end-grain balsa, laminated on first and second surfaces 14,15 with a fiber-reinforced plastic, such as epoxy fiberglass, was tested to determine load transfer. Several ¾" balsa core panels 13 were laminated on first and second surfaces 14,15 using various strength epoxy fiberglass laminate skins 16. The resulting panels were placed over a 12" OD cylinder and subjected to increasing pressure until failure. The pressure was applied using a 3" hexagonal shaped piece of steel applied to the center of the panel. The maximum load which could be applied to each panel is shown in Table B.

TABLE B

| | Fiberglass Laminate Design | Ram Pressure @ Failure (psi) | Ram Force @ Failure (N) |
|---|---|---|---|
| Panel 1 | 2 × 600 g (0–90°) | 2200 | 21920.8 |
| Panel 2 | 1 × 600 g (0–90°) 1 × 600 g (±45°) | 3000 | 29892.1 |
| Panel 3 | 2 × 600 g (0–90°) resin saturated core | 4000 | 39856.1 |
| Panel 4 | 1 × 1600 g (Quad) 1 × 600 g (0–90°) | 5000 | 49820.1 |
| Panel 5 | 2 × 1600 g (Quad) | 6500 | 64766.1 |

The laminated balsa panel 12 was determined to be capable of sustaining high loads. Based on the testing, it was concluded that it would be preferable to position load transfer plates on either side of the laminate panel and mechanically join the plates to support the laminate interface at the load-transferring points for reducing the possibility of laminate separation under load conditions.

It was calculated and confirmed using a scale mock up, that the volume of foam used in the testing would deform approximately 73% as a result of the impact imposed during the test. This "real world" test gave results comparable to the expected results based on the theoretical calculations.

EXAMPLE B

Mounting System for Longitudinally Oriented Cylinders

Figure 10A:
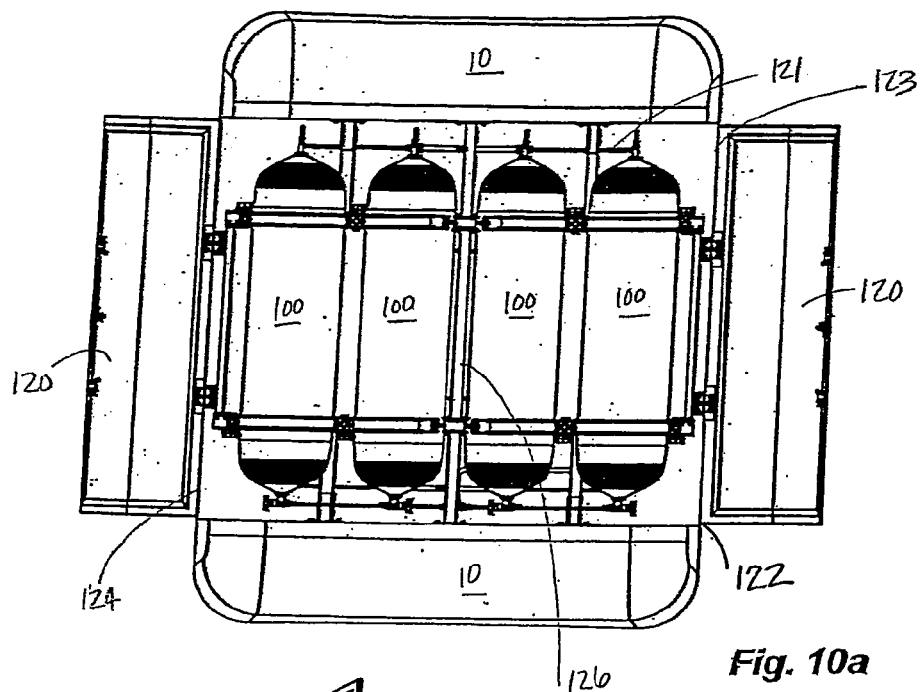
FIG. 10a is a top view of an embodiment of the longitudinal mounting system according to FIG. 4a, the gull-wing doors open to view the frame and fuel cylinders mounted thereto.
Figure 10B:
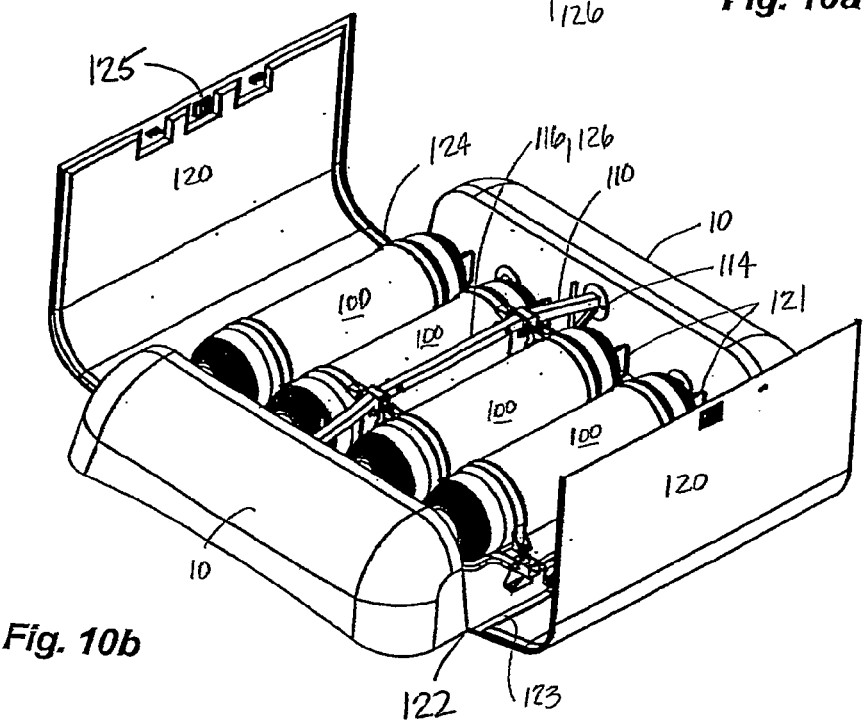
Figure 11A:
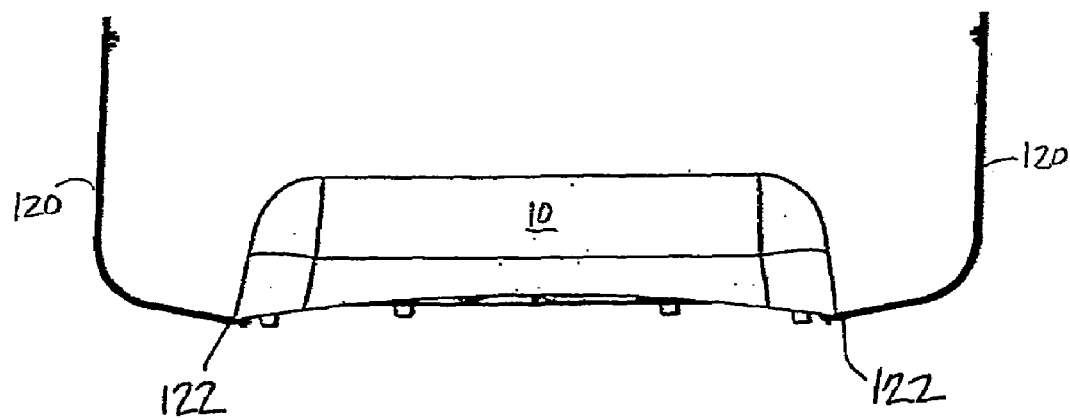
Figure 11B:
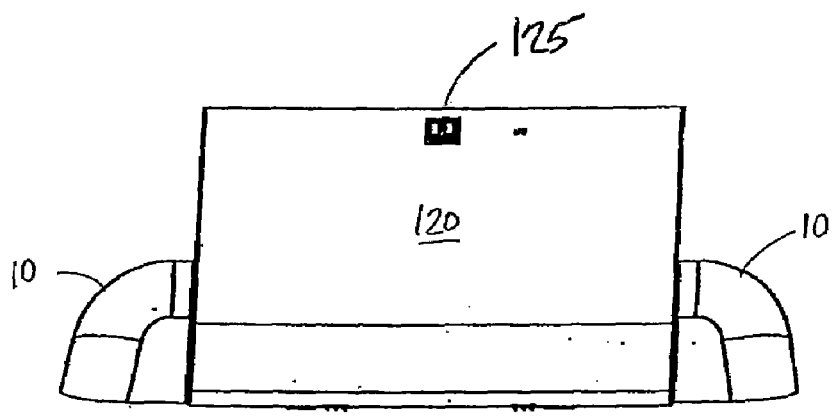
Figure 12:
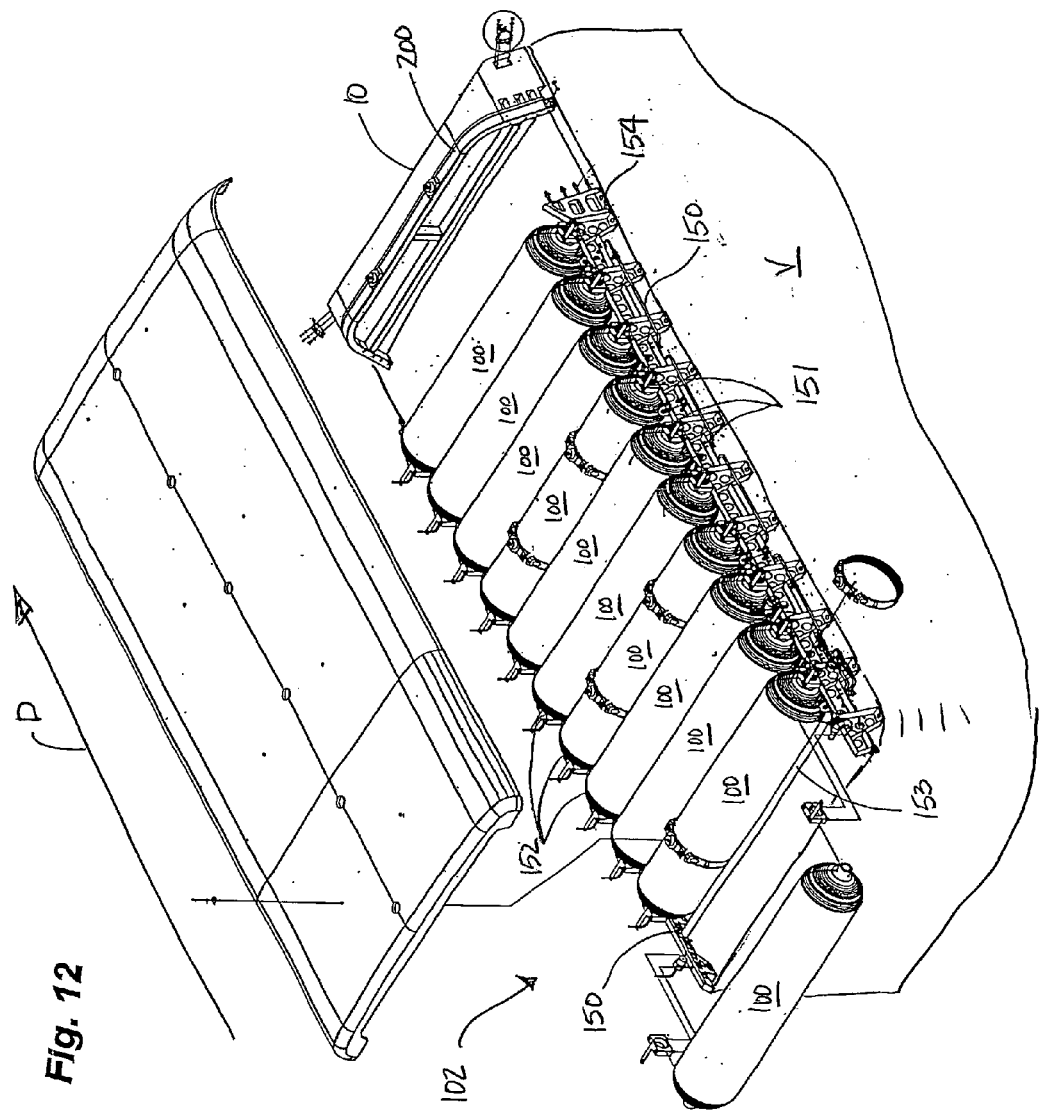
FIG. 12 is an exploded perspective view of an embodiment of a mounting system comprising at least one impact assembly according to FIGS. 1a–2e and a frame adapted for use in mounting fuel cylinders transversely onto a vehicle.

Having reference to FIGS. 4a–10b and 12, an embodiment of a mounting system 102 is shown in the case where the fuel cylinders 100 are mounted longitudinally on a vehicle V and aligned axially with the direction of travel D. Best shown in FIGS. 4a, 8, and 9a–9c, the frame 101 comprises intermediate frame members or struts 110 which are interconnected to and positioned between transverse mounting members 111 and to at least a first or front impact assembly 10 positioned adjacent a first end of the cylinders 103 and oriented to face towards the direction of travel of the vehicle. As shown in FIGS. 10a and 10b, preferably, a second rear impact assembly 10 is positioned at an opposing end 104 of the cylinders 100 and is similarly interconnected by struts 110 to the transverse mounting members 111 and frame 101. The impact assemblies 10,10 are as previously described.

The struts 110 extend axially from the mounting members 111 in the direction of travel of the vehicle and are fastened to the inner laminated balsa layer 12 for transferring residual load from the impact assembly 10 through the strut 110 and into the frame 101. The struts 110 may be adhesively fastened to the inner layer 12 or alternatively, may be mechanically fastened to the inner layer 12. Preferably, the struts 110 are fastened to the inner layer 12 using mounting plates 114 which are adhesively bonded or mechanically fastened to the inner layer 12. Most preferably, mounting plates 114 are positioned on opposing sides of the inner laminated balsa layer 12, one within the assembly 10 and one on the strut 110 and are bolted therethrough to assist in preventing de-lamination of the inner layer 12.

Most preferably, as shown in FIGS. 5a–5d and 7a–7d, mounting plates 114 are fastened to an inner surface of the laminated balsa layer 12 having fasteners 115 extending therethrough for connection with a corresponding mounting plate 114 mounted to a strut 110 (FIG. 4b) of the frame 101.

Figure 4B:
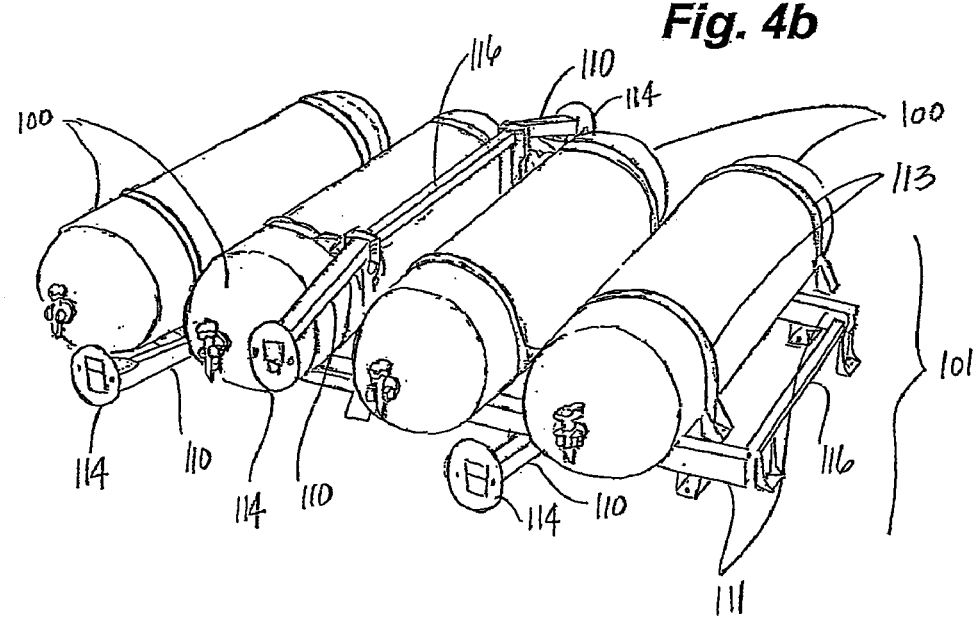
FIG. 4b is a perspective view of an embodiment of the frame for use in the mounting system according to FIG. 4a, illustrating struts and support flanges for transferring load from the bumper and inner laminated balsa layer to the frame.
Figure 4A:
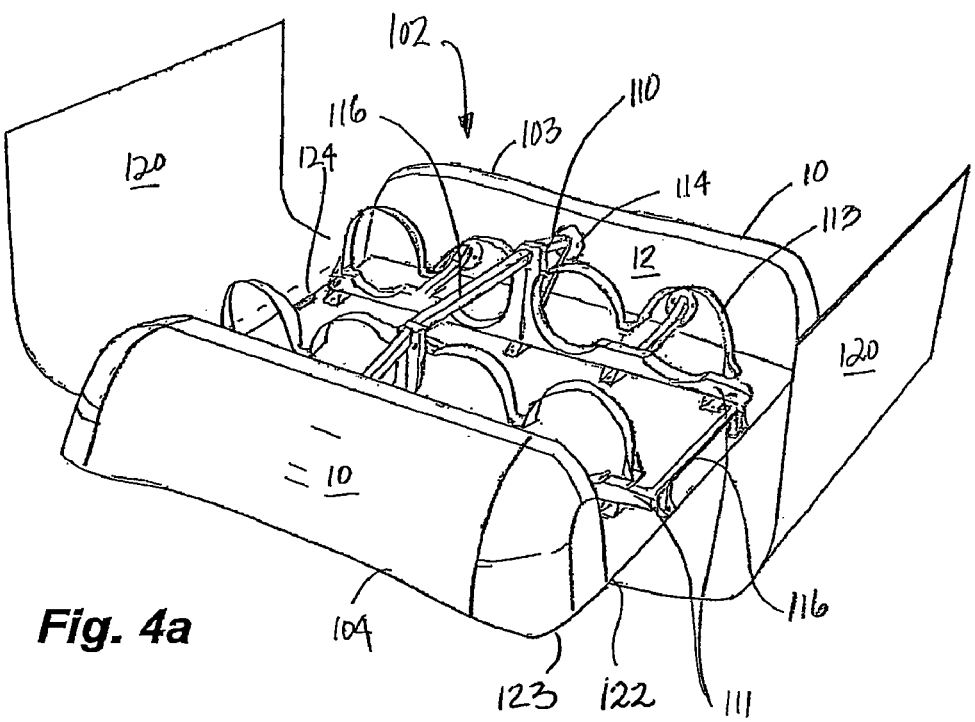
FIG. 4a is perspective view of an embodiment of a mounting system comprising front and rear impact assemblies and a frame having struts and load absorbing attachment plates for transferring load to the impact assemblies and adapted for use in mounting fuel cylinders longitudinally onto a vehicle and oriented in the direction of travel, the cylinders omitted for illustrating the frame.
Figure 8:
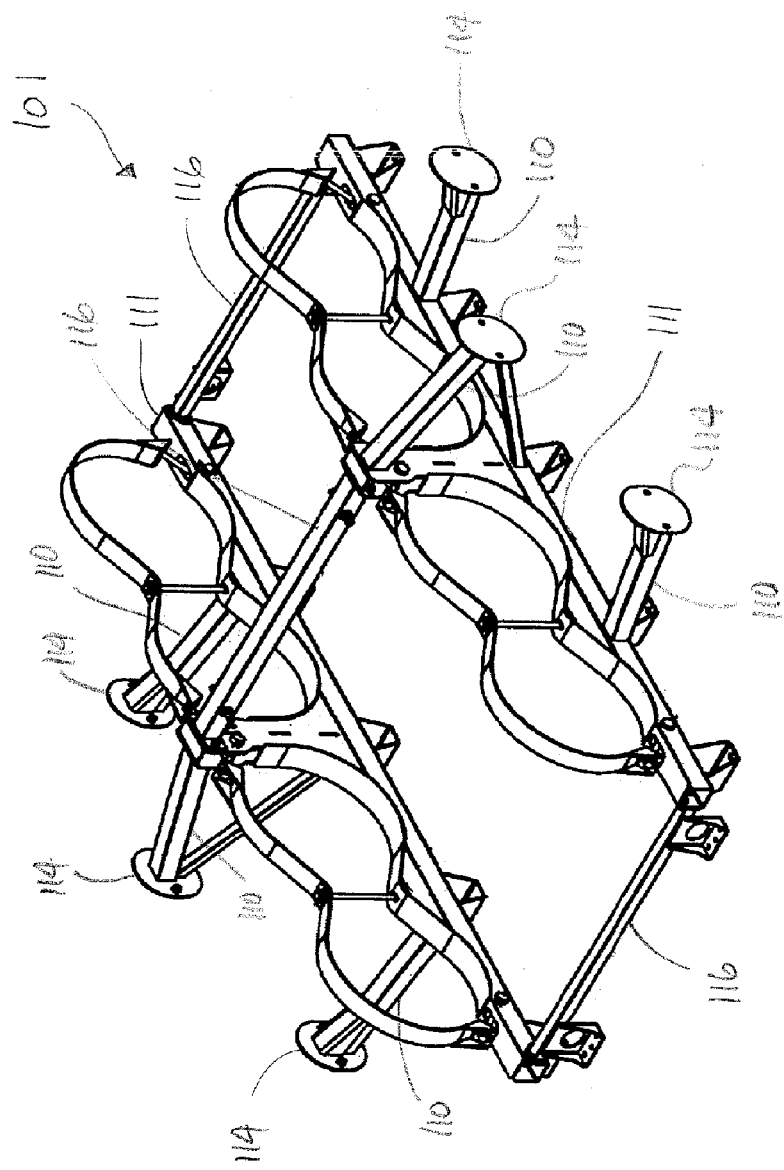
FIG. 8 is a detailed perspective view of the frame according to FIGS. 4a and 4b.

As shown in FIG. 4b, additional longitudinal structural support members 116 extend between the transverse mounting members 111 for spacing the mounting members 111 and providing structural rigidity thereto. The struts 110 are connected at various points of contact over the inner layer 12 for evenly distributing the load throughout the frame 101.

In a preferred embodiment, as shown in FIGS. 4a, 6a–6d and 10a–11c the mounting system 102 is further provided with doors 120 which extend between the front and rear impact assemblies 10,10 and cover the cylinders 100 to protect the cylinders 100, associated valving 121 and the frame 101 from the elements. Preferably, the doors 120 are gull-wing type doors which are hinged 122 along opposing outer longitudinal edges 123,124 of the frame 101. The doors 120 are latched 125 above a center raised longitudinal support member 126, the raised longitudinal support member 126 acting to prevent minor impact to the cylinders 100 from above.

Figure 20A:
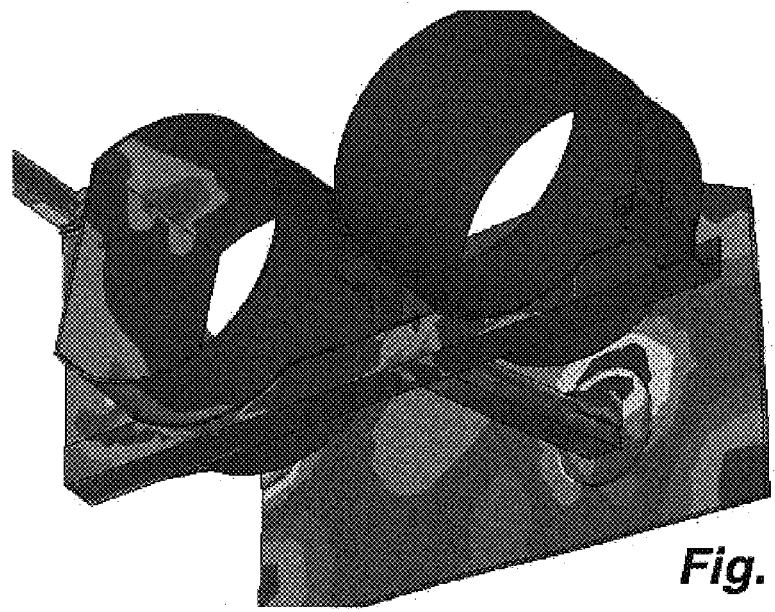
FIGS. 20a and 20b are Von Mises stress plots illustrating stresses in a frame having an impact assembly according to an embodiment of the invention as shown in FIGS. 4a–4b, the cylinders being mounted in the direction of travel of a vehicle and having undergone an impact.
Figure 20B:
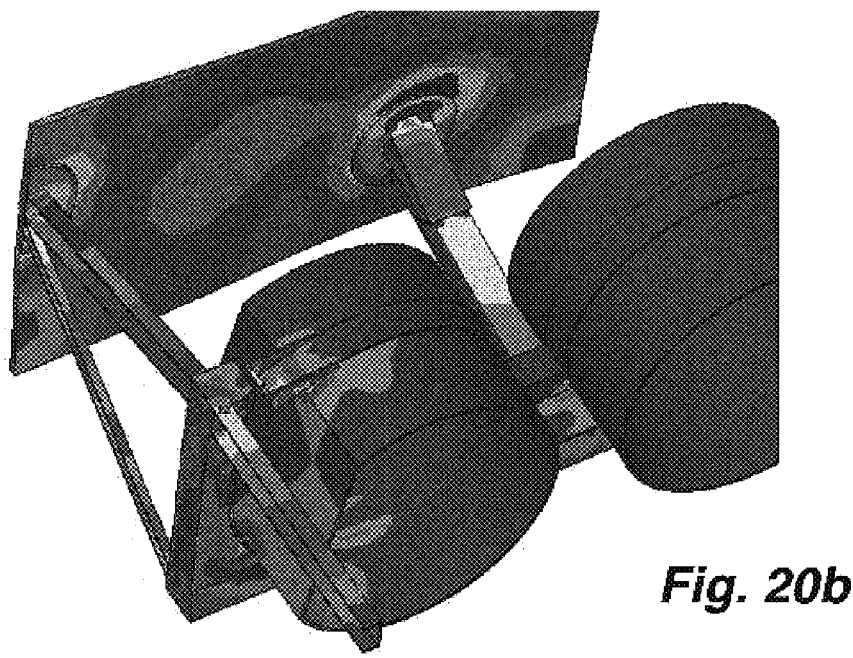
Figure 22A:
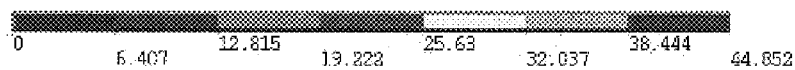
FIG. 22a is a deflection plot illustrating deflection of an aluminum beam having undergone analysis at impact test conditions.
Figure 22B:
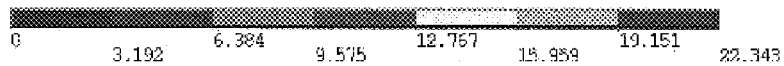
Figure 23:
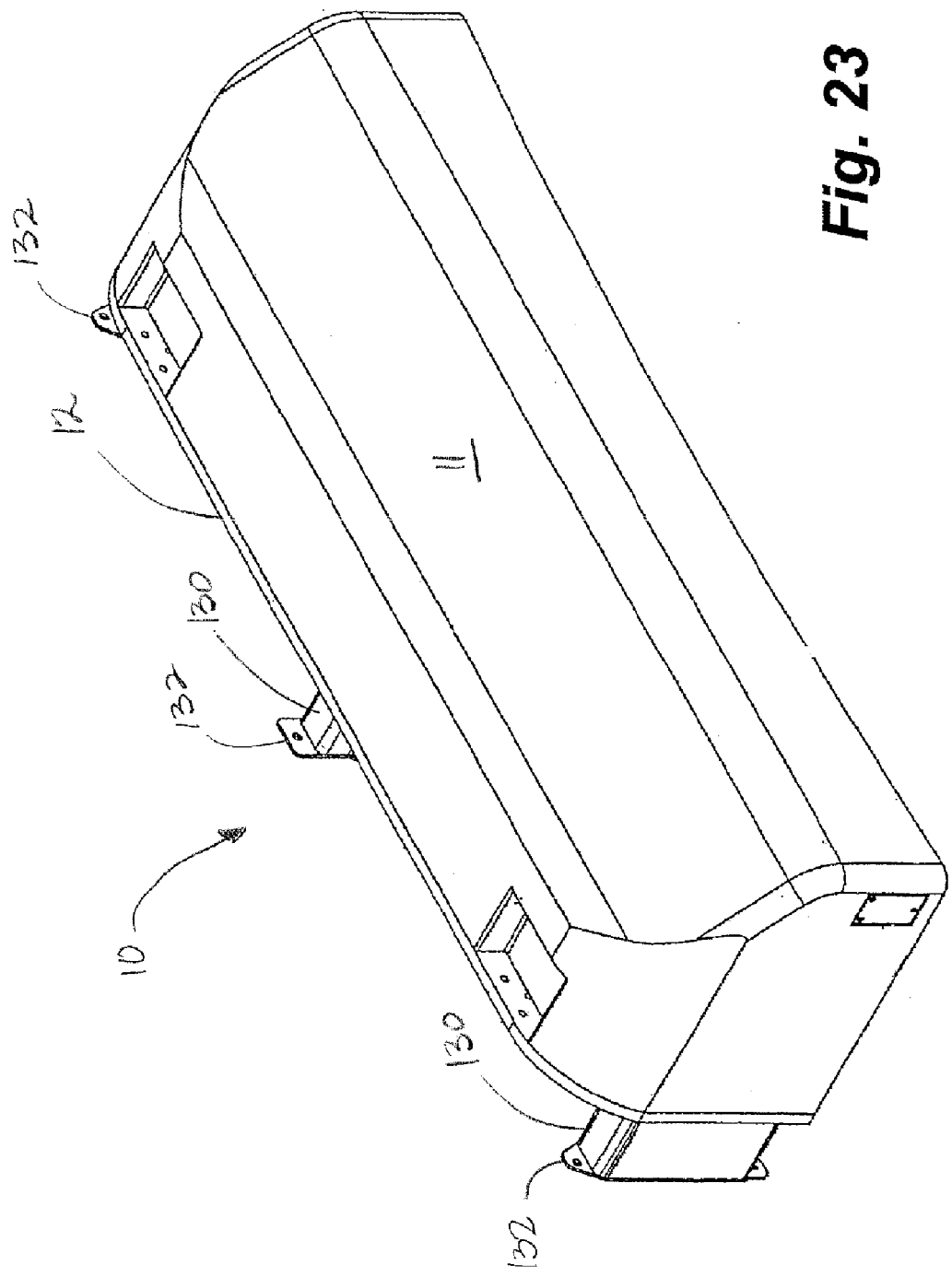
FIG. 23 is a front perspective view of an embodiment of the invention having an impact assembly connectable to a frame using balsa pillars.
Figure 25A:
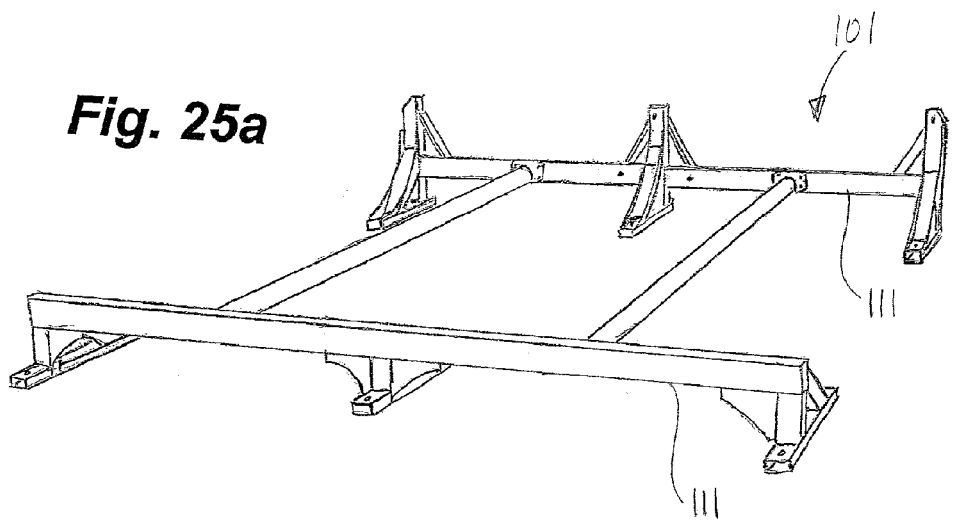
FIG. 25a is a rear perspective view of a frame suitable for use with the impact assembly according to FIG. 23.
Figure 25B:
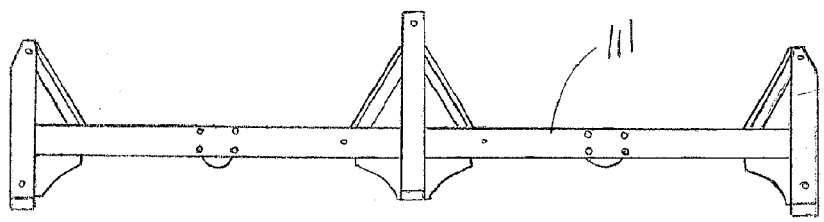
Figure 25C:
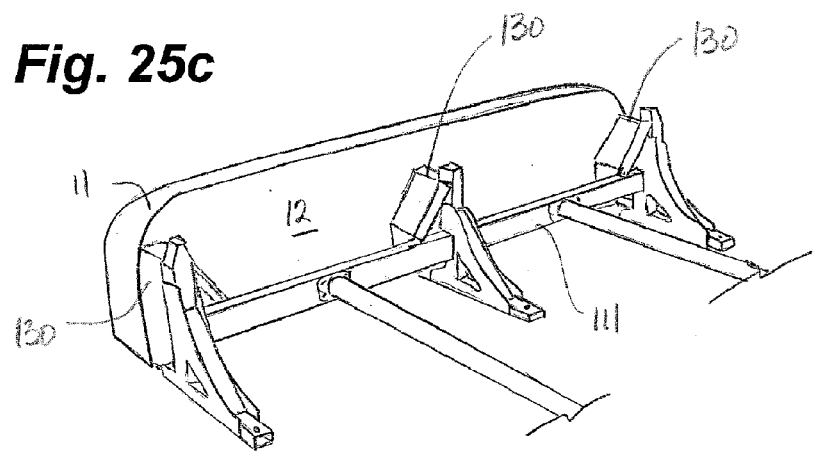
FIG. 25c is a rear perspective view according to FIG. 25a and having an impact assembly fastened to the frame.

As shown in FIGS. 20a–20b finite element analysis was conducted and the mounting system 102 and impact assembly 10, as designed, demonstrated acceptable resistance to inertial loads and further prevented any impact directly to the cylinders.

In another embodiment, as shown in FIGS. 23–26b, the intermediate members 110 are end-grain balsa pillars 130 which are adhesively bonded to the load-transferring inner layer 12. As shown in greater detail in FIG. 24b, the pillars 130 may also be additionally fastened to the inner layer 12 using fasteners 131. Mounting plates 132 are mounted to the pillars 130 for connection of the impact assembly 10 to the frame's transverse mounting members 111. The use of the balsa pillars 130 in lieu of struts 100, further reduces the weight of the frame 101.

Figure 26A:
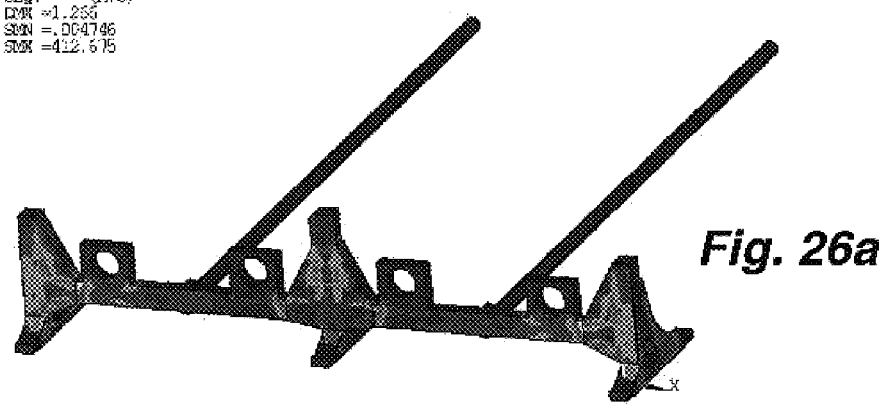
FIG. 26a is a Von Mises Stress plot of a system according to FIG. 25c, illustrating analysis of the frame under loading equivalent to 50,000 lbs. at 5 mph.
Figure 26B:
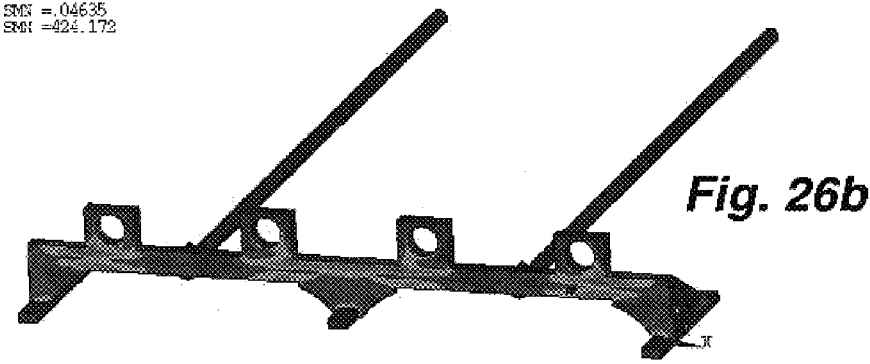
FIG. 26b is a Von Mises Stress plot of the system according to FIG. 25c illustrating analysis of the frame under longitudinal loading equivalent to 20 g.

As shown in FIG. 26a, finite element analysis was performed using impact loading equivalent to 50,000 lbs at 5 mph. The deflection was 1.3 mm. Further, as shown in FIG. 26b, analysis was performed at longitudinal loading equivalent to 20 g and the deflection was 1.2 mm.

EXAMPLE C

Mounting System for Transversely Oriented Cylinders

Figure 13:
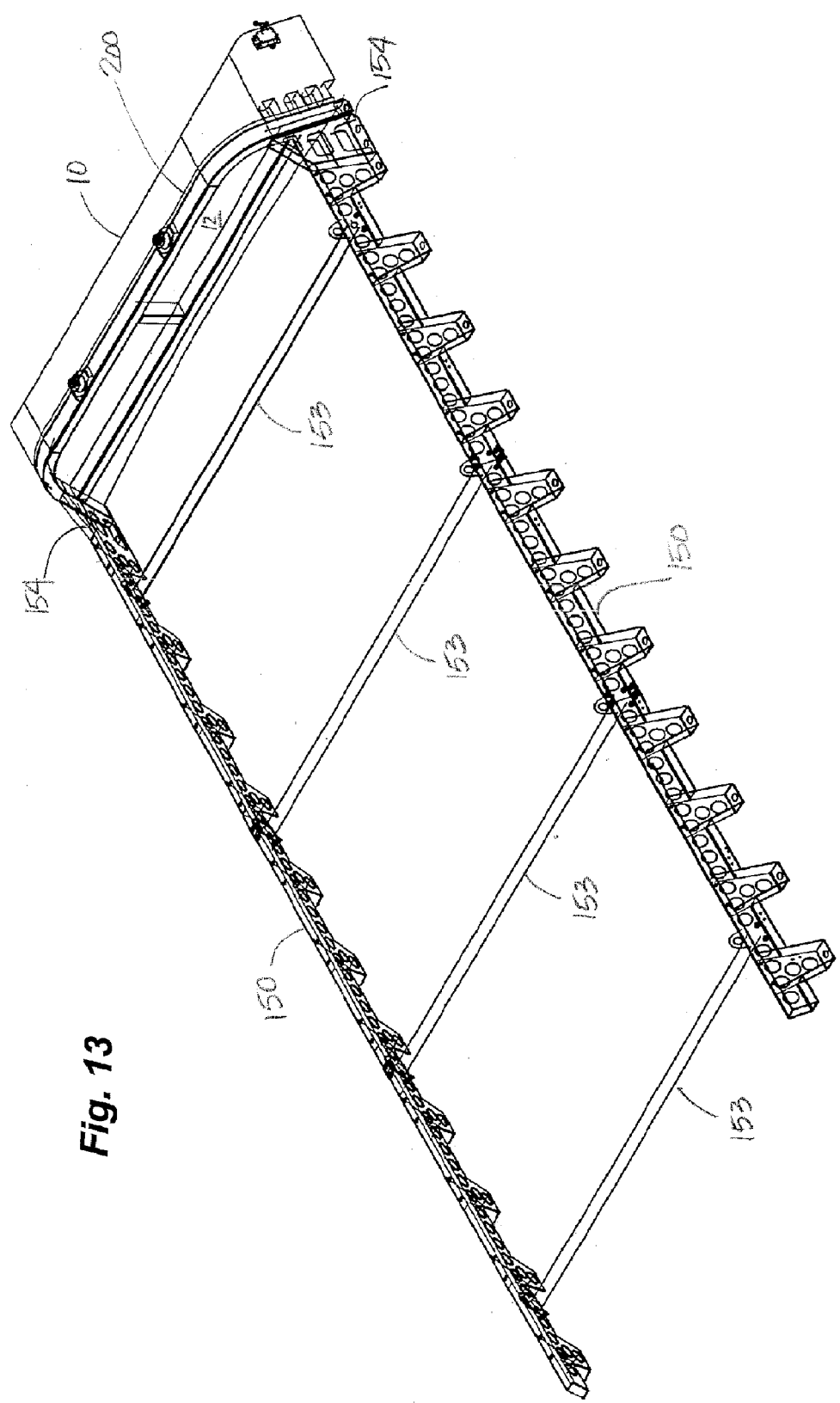
FIG. 13 is a rear perspective view of the longitudinal frame, an impact assembly and a reinforcing beam assembly according to FIG. 12.
Figure 14:
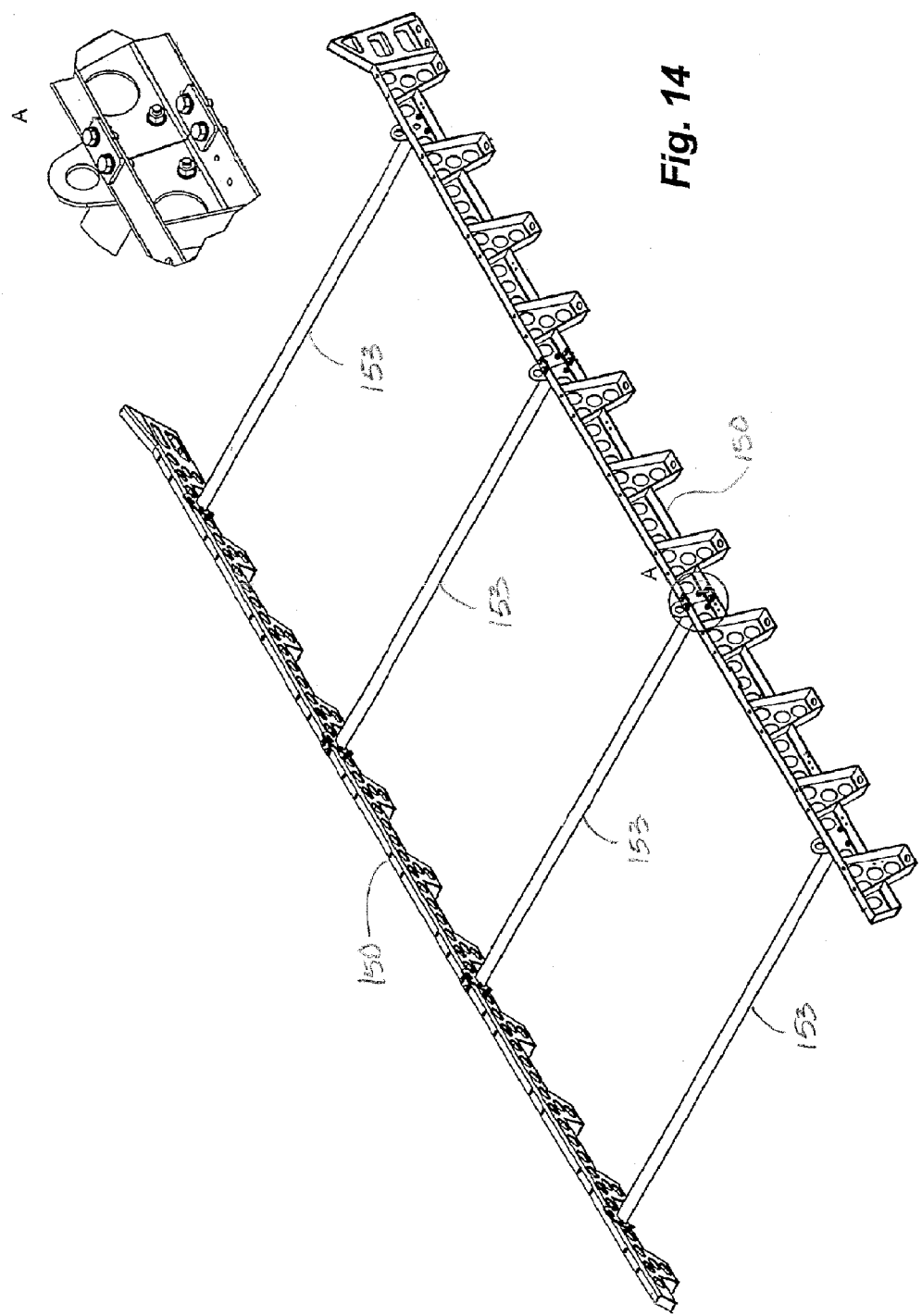
FIG. 14 is a rear perspective view of the longitudinal frame detailing a connection A between segments along a length of the frame.
Figure 15:
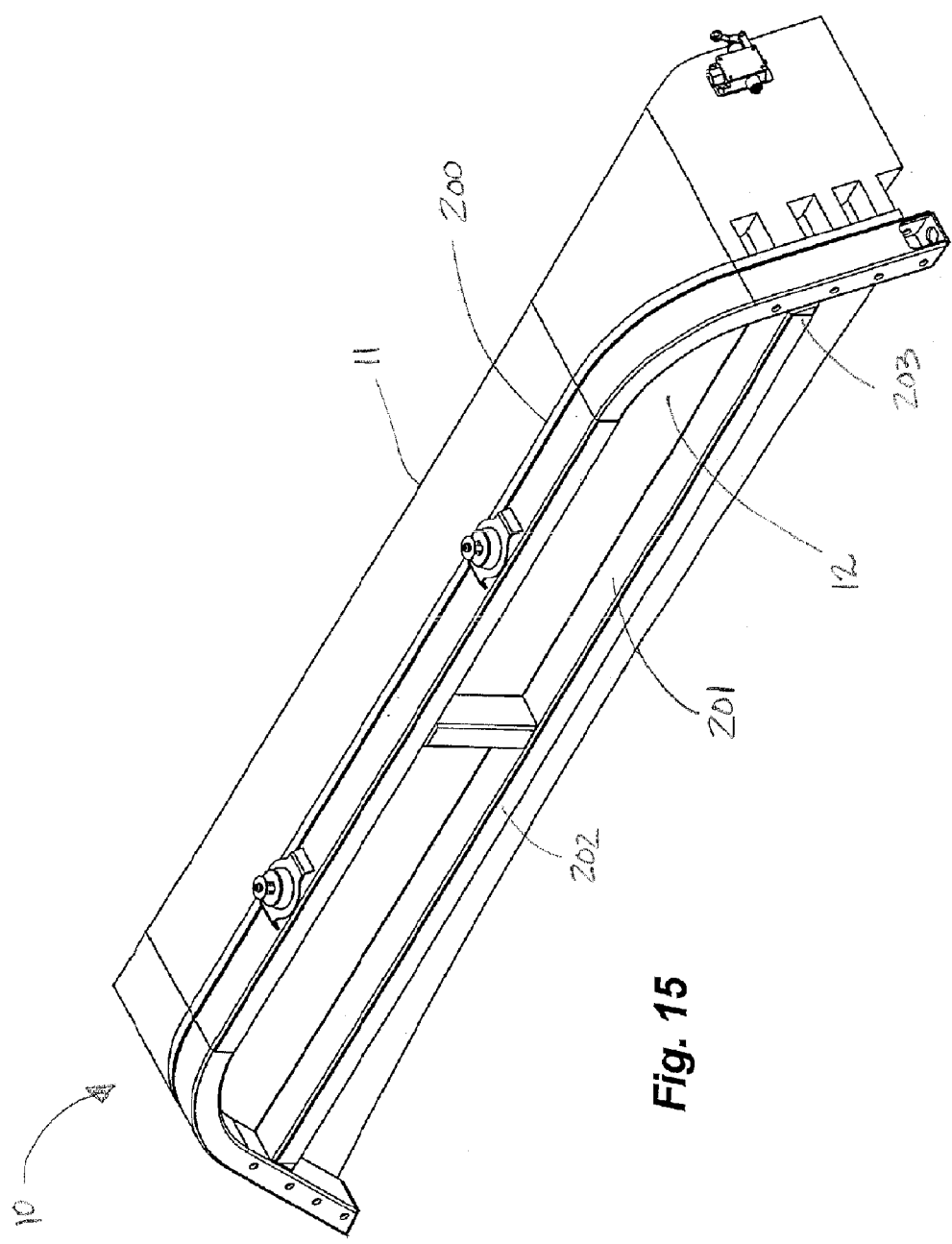
FIG. 15 is a rear perspective view of the impact assembly and the beam assembly.
Figure 16A:
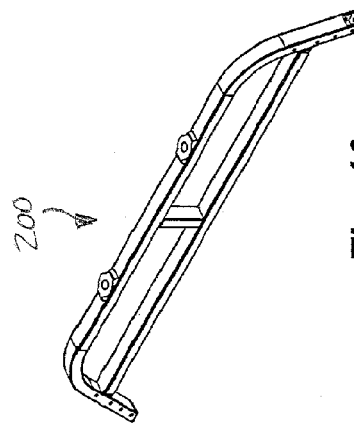
FIGS. 16a–16e illustrate the details of the beam assembly according to FIG. 12, more particularly.
Figure 16E:
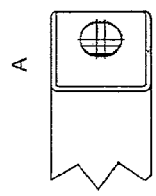
Figure 16B:
Figure 16C:
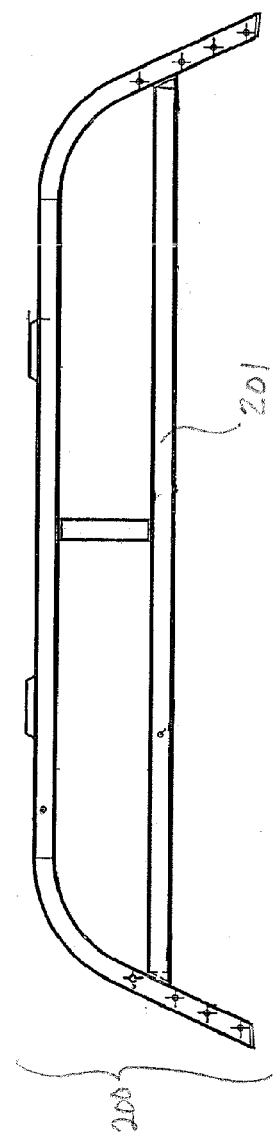
Figure 16D:
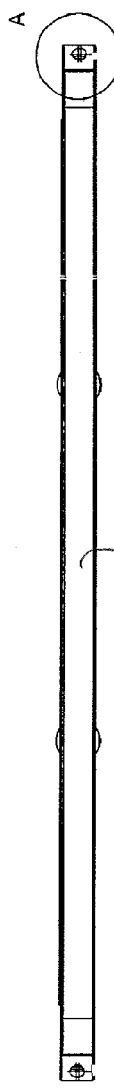
Figure 18A:
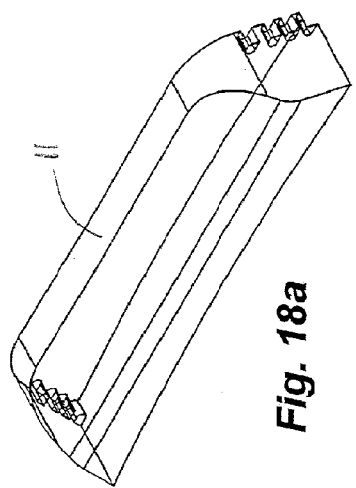
FIG. 18a is a rear isometric view of a foam outer layer according to FIG. 12.
Figure 18D:
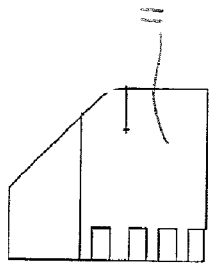
Figure 18B:
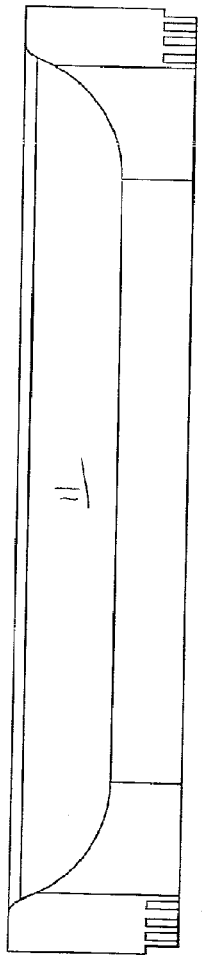
Figure 18C:
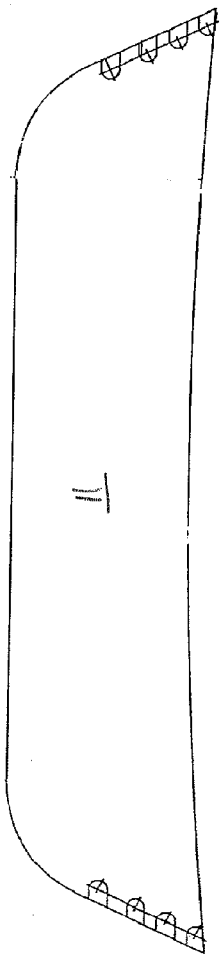

As shown in FIGS. 12–18d an embodiment of a mounting system 102 is shown in which the fuel cylinders 100 that are to be mounted transverse to the direction of travel. A pair of spaced, parallel, longitudinal frame members 150 are provided to which opposing ends 151,152 of the transversely-oriented fuel cylinders 100 are mounted, the cylinders 100 further acting as structural members. As shown in FIGS. 13 and 14, additional transverse support members 153 for spacing and supporting the longitudinal members 150 may be provided at intervals along a length of the longitudinal members 150. At least a first or front impact assembly 10, as previously described, is connected to a first end 154 of each of the longitudinal members 150. Residual impact load is transferred from the inner laminated balsa layer 12 to the longitudinal members 150. Preferably, the impact assembly 10 is mechanically fastened to the longitudinal support members 150. As there may be no intermediate frame members between the two longitudinal support members 150 adjacent the impact assembly 10, the impact assembly 10 must span between the frame members 150. It is preferable that a reinforcing beam assembly 200 be positioned between the impact assembly 10 and the longitudinal frame members 150 to assist in distributing impact loads to transverse end extremities of the impact assembly 10, thereby ensuring residual load is transferred anywhere along the inner layer 12 to the longitudinal frame members 150.

The reinforcing beam assembly 200, best seen in FIGS. 15 and 16a–16e, is positioned transversely between the longitudinal support members 150 immediately adjacent the inner laminated balsa layer 12 (FIGS. 17a–17c) and extending substantially along a width of the impact assembly 10. As shown in FIGS. 18a–18d, a suitable foam layer 11 is provided.

Figure 19:
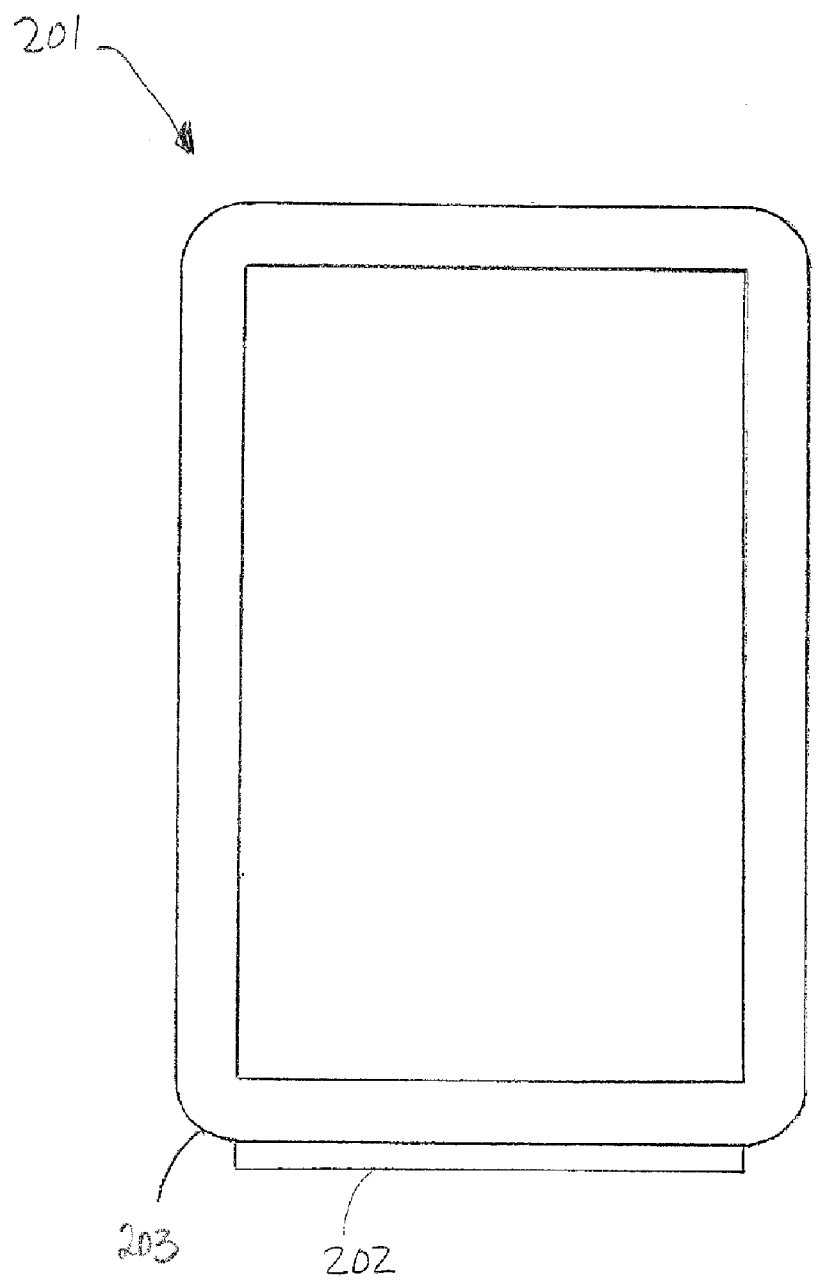
FIG. 19 is a cross-sectional view of the linear support beam having a carbon-fiber strip adhesively bonded to a rearward/inward side for increasing the stiffening of the support beam according to FIG. 16c.

Preferably, as shown in greater detail in FIG. 19, the reinforcing beam assembly 200 further comprises a linear hollow aluminum support beam 201 having a carbon fiber/epoxy strip 202 bonded to an inward, rearward edge 203 of the beam 201. The carbon fiber/epoxy strip 202 is bonded to the side of the beam 201 which enters into tension in an impact for increasing the stiffness of the beam 201 while retaining its lightweight characteristics. Further, the carbon fiber/epoxy strip 202 has a high modulus of elasticity and acts under load to shift a neutral axis of the support beam 201 towards the epoxy/carbon fiber strip 202, thus placing more of the beam 201 into compression. Preferably, the carbon fiber/epoxy strip 202 comprises carbon fibers embedded in an epoxy resin and the strip 202 is adhesively bonded to the aluminum beam 201 using an adhesive such as methylmethacrylate. Methylmethacrylate adhesive has a very high lap shear strength of 2000 psi (13.8 MPa) and bonds well to metallic surfaces. Based on analysis, the addition of a 3 mm thick carbon fiber/epoxy strip 202 will theoretically increase the stiffness of the aluminum beam by 36% and the addition of a 5 mm thick carbon fiber/epoxy strip 202 will theoretically increase the stiffness of the aluminum beam by 57%.

In the example shown, the frame 101 was manufactured from steel, CSA G40.21 44 W having a modulus of elasticity of 207 Gpa, a Poisson Ratio of 0.27 and a tensile strength (Yield) of 300 MPa. The aluminum reinforcing beam assembly 200 and particularly the linear support beam 201 were manufactured from 6061 aluminum having a modulus of elasticity of 69 GPa, a Poisson ratio of 0.33 and a tensile strength (yield) of 275 MPa. The carbon fiber, MR35E, had a modulus of elasticity (x) of $2.102e^5$ MPa, a modulus of elasticity (y) of 6400 MPA, a modulus of elasticity (z) of 9606 MPa, a Poisson ratio (xy) of 0.25506, a Poisson ratio (xz) of 0.27148, a Poisson ratio (yz) of 0.4048, a shear modulus (xy) of 4406 MPa, a shear modulus (xz) of 4395.9 MPa, a shear modulus (yz) of 2501.3 MPa and an ultimate tensile strength (x) of 2670 MPa.

As shown in FIGS. 21a–22b finite element analysis of the frame 101 and impact assembly 10, a pressure of 0.5 MPa was applied to the laminated balsa layer 12 on the frame 101 which was determined to be the force produced during compression of the foam layer 11 when subjected to the impact of a 60,000 lb bus moving at 5 mph. A maximum displacement of 38 mm was observed in the linear aluminum support beam 201, while displacement of the steel frame 101 was minimal at less than 5 mm. Von Mises stresses were observed in areas that exceed the yield strength of the materials however this was determined to be acceptable due to the nature of the loading and the fact that once impacted the frame 101 and impact assembly 10 would be inspected and replaced as necessary. Areas of yielding in the steel frame 101 were mostly compressive and would not result in a catastrophic failure. Areas of yielding in the aluminum support beam 201 resulted in limited deformation acceptable to prevent damage to the cylinders.

Significant weight reductions were achieved in embodiments of the invention disclosed herein. The embodiments disclosed herein reduced the weight of the frame by ½ to ¼ conventional steel frames while meeting the stringent crash standards required for use in Canada. For example, a conventional steel frame suitable for roof-mounting cylinders was estimated to weigh about 100 kg while embodiments of the frame 101, according to the embodiment of the system disclosed herein, reduced the weight to 52 kg using steel struts and to 22 kg when using end grain balsa pillars 130 as the intermediate members 110.

What is claimed is:

1. A system for protecting the integrity of one or more fuel cylinders mounted to a structure and subjected to impact loading comprising:

a frame adapted for mounting to the structure and adapted for supporting the fuel cylinders thereon; and at least a first impact assembly comprising:
an outer compression layer adapted to receive the impact loading; and
an inner transfer layer adhesively bonded to the outer layer and in structural communication with the frame for absorbing the impact loading and transferring said impact loading to the frame.

2. The system as described in claim 1 wherein the at least a first impact assembly is fastened to the frame which is adapted to be fastened to a vehicle, and wherein the outer compression layer is directed in a direction of travel of the vehicle.

3. The system as described in claim 1 further comprising at least a second impact assembly in structural communication with the frame.

4. The system as described in claim 3 wherein the at least a second impact assembly is fastened to an opposing side of the frame.

5. The system as described in claim 1 wherein the outer facing compression layer is a foam layer.

6. The system as described in claim 1 wherein the transfer layer is a highly cellular load-transferring layer.

7. The system as described in claim 1 wherein the transfer layer is end-grain balsa laminated on a first and second surface using a fiber reinforced plastic.

8. The system as described in claim 1 further comprising a skin formed about the outer and inner layers.

9. The system as described in claim 8 wherein the skin is a polymer.

10. The system as described in claim 1 further comprising load absorbing attachment plates fastened to the transfer layer for communicating the impact loading from the impact assembly to the frame.

11. The system as described in claim 1 wherein the frame further comprises:
mounting members, spaced apart and adapted for mounting opposing ends of the fuel cylinders thereon; and
intermediate members positioned between the mounting members and the at least a first impact assembly for transferring residual load from the transfer layer to the mounting members.

12. The system as described in claim 11 wherein the intermediate members are connected between the mounting members and load absorbing attachment plates fastened to the transfer layer for communicating the impact loading from the impact assembly to the frame.

13. The system as described in claim 11 wherein the mounting members are transverse mounting members and the intermediate members are struts extending from the transfer layer to the mounting members.

14. The system as described in claim 11 wherein the mounting members are transverse mounting members and the intermediate members are balsa pillars extending from the transfer layer to the mounting members.

15. The system as described in claim 11 wherein,
the mounting members are longitudinal mounting members; and
the intermediate member is a reinforcing beam assembly spanning between the longitudinal mounting members and the at least a first impact assembly for transferring the residual load from the inner layer to the longitudinal mounting members.

16. The system as described in claim 15 wherein the reinforcing beam assembly further comprises a linear reinforcing beam extending substantially the length of the impact assembly for transferring residual load from the inner transfer layer to longitudinal mounting members.

17. An impact assembly for transferring impact loading into a structure comprising:
an outer facing compression layer adapted for receiving the impact loading;
an inner absorption layer adhesively bonded to the outer layer and defining a plane of load transference to the structure; and
a skin formed about the outer facing compression layer and the inner absorption layer.

18. The impact assembly as described in claim 17 wherein the outer facing compression layer is a foam layer.

19. The impact assembly as described in claim 18 wherein the foam is a polystyrene foam.

20. The impact assembly as described in claim 17 wherein the absorption layer comprises a highly cellular load-transferring material.

21. The impact assembly as described in claim 20 wherein the highly cellular load-transferring material is end-grain balsa.

22. The impact assembly as described in claim 21 wherein the end-grain balsa is laminated on a first and second surface with a fiber-reinforced plastic.

23. The impact assembly as described in claim 17 wherein the skin is a polymer.

24. The impact assembly as described in claim 23 wherein the polymer is epoxy fiberglass.

25. The impact assembly as described in claim 17 further comprising load absorbing attachment plates fastened to the inner layer and adapted for connection of the impact assembly to the structure.

26. The impact assembly as described in claim 25 wherein the load absorbing attachment plates fastened to the inner layer are adapted for connection to a frame for mounting fuel cylinders.

* * * * *